(12) United States Patent
Ji et al.

(10) Patent No.: US 11,030,114 B2
(45) Date of Patent: Jun. 8, 2021

(54) SHARED VOLUME BASED CENTRALIZED LOGGING

(71) Applicant: International Business Machines Corporation, Armonk, NY (US)

(72) Inventors: Zi Lian Ji, Shanghai (CN); Lin Juan Xia, Shanghai (CN); Xian Dong Meng, Shanghai (CN); Shi Xin Ruan, Wuxi (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 16/387,077

(22) Filed: Apr. 17, 2019

(65) Prior Publication Data

US 2020/0334170 A1 Oct. 22, 2020

(51) Int. Cl.
*G06F 3/06* (2006.01)
*G06F 12/1072* (2016.01)

(52) U.S. Cl.
CPC ........ *G06F 12/1072* (2013.01); *G06F 3/0604* (2013.01); *G06F 3/067* (2013.01); *G06F 3/0655* (2013.01); *G06F 2212/656* (2013.01)

(58) Field of Classification Search
CPC .. G06F 12/1072; G06F 3/0604; G06F 3/0655; G06F 3/067; G06F 2212/656
See application file for complete search history.

(56) References Cited

U.S. PATENT DOCUMENTS

| 9,507,798 | B1 | 11/2016 | Zhao et al. | |
|---|---|---|---|---|
| 9,697,219 | B1 | 7/2017 | Wang et al. | |
| 2010/0205369 | A1* | 8/2010 | Chang | G06F 3/064 711/113 |
| 2011/0099219 | A1* | 4/2011 | Chang | G06F 9/5027 709/203 |

(Continued)

FOREIGN PATENT DOCUMENTS

CN 102411533 A 4/2012

OTHER PUBLICATIONS

P. Mell, et al. "*The NIST Definition of Cloud Computing*", NIST Special Publication 800-145, Sep. 2011, Gaithersburg, MD.

*Primary Examiner* — Charles Rones
*Assistant Examiner* — Han V Doan
(74) *Attorney, Agent, or Firm* — Christopher Pignato; George S. Blasiak; Heslin Rothenberg Farley & Mesiti PC

(57) ABSTRACT

Methods, computer program products, and systems are presented. The method computer program products, and systems can include, for instance: collecting logging data generated by operation of a distributed computing system that is used by a plurality of tenants; storing the logging data as a plurality of files stored in a multi tier, shared volume storage system, with the storage of the logging data as a plurality of files including: dividing the plurality of files among and between a plurality of shared volume data structures, and organizing each shared volume data structure of the plurality of shared volume data structures according (Continued)

to a plurality of tiers; for each given file of the plurality of files; and mapping, by a domain agent and in a mapping table data structure, an association between the given file and the shared volume data structure in which the given file is stored.

20 Claims, 16 Drawing Sheets

(56) References Cited

U.S. PATENT DOCUMENTS

| | | | | |
|---|---|---|---|---|
| 2013/0007062 A1* | 1/2013 | Dutta | ............... | G06F 16/176 707/792 |
| 2015/0205818 A1* | 7/2015 | Darcy | ............... | H04L 67/1097 707/822 |
| 2016/0170783 A1* | 6/2016 | Bhogal | ............... | G06F 9/45504 718/1 |
| 2016/0301753 A1 | 10/2016 | Auch | | |

* cited by examiner

LOG FILE TABLE 4000

| FILE NAME | X | FOLDER | VOLUME | TENANT | Y | Z |
|---|---|---|---|---|---|---|
| AA 001 | XX | A001 | AA | A | XX | XX |
| AA 002 | XX | A001 | AA | A | XX | XX |
| AA 003 | XX | A001 | AA | A | XX | XX |
| AA 011 | XX | A011 | BB | A | XX | XX |
| BB 001 | XX | B001 | AA | B | XX | XX |
| BB 011 | XX | B011 | BB | B | XX | XX |
| BB 012 | XX | B011 | BB | B | | |
| ⋮ | ⋮ | ⋮ | ⋮ | ⋮ | ⋮ | ⋮ |
| ZZ 001 | XX | Z001 | AA | Z | XX | XX |
| ZZ 002 | XX | Z001 | AA | Z | XX | XX |
| ZZ 011 | XX | Z011 | BB | Z | XX | XX |

FIG. 4

| ROW | TENANT | LOG FILE CLASSIFICATION | FILE NAME | ACTION DECISION |
|---|---|---|---|---|
| 1 | A | 00A | - | SEND LOG FILE LOGGING DATA WHEN NETWORK TRAFFIC IS BELOW THRESHOLD; ALARM PROFILE A |
| 2 | A | 00B | - | GENERATE ANALYSIS REPORT R002 AND SEND REPORT ON COMPLETION OF LOGGING |
| 3 | A | 00C | - | GENERATE ANALYSIS REPORT R001 AND SEND REPORT ON COMPLETION OF LOGGING; ALARM PROFILE C |
| 4 | B | 00A | - | SEND SAMPLE LOGGING DATA GENERATE ANALYSIS REPORT R001 AND SEND REPORT ON COMPLETION OF LOGGING/ SEND SAMPLE LOGGING DATA ON COMPLETION OF LOGGING; ALARM PROFILE B |
| 5 | B | 00B | - | SEND LOG FILE LOGGING DATA ON REQUEST FROM TENANT |
| 6 | B | 00C | - | SEND LOG FILE LOGGING DATA ON REQUEST FROM TENANT : ALARM PROFILE A |
| 7 | A | - | XX | XXXX |
| ... | ... | ... | | ... |

FIG. 6

SHARED VOLUME BASED CENTRALIZED LOGGING

BACKGROUND

In a hosted service computing system, many, if not all, the computing nodes are embodied by physical server computers. It is noted that there may be virtual computer(s) instantiated, and running, within each computing node, but the computing node is the entirety of physical host machine. These computing nodes host applications, meaning that the applications run on the computing nodes for use by various remote clients (for example, cloud customers). Each instantiation of a given application on the computing node(s) of the hosted service system is allocated to a different tenant (for example an enterprise entity that is a cloud customer) that is registered to use the hosted services system. The hosted services system, the computing devices of clients/customers, and the communication networks over which they communicate are herein referred to a "hosted service computing environment." In embodiments where multiple tenants commonly use the same hosted service computing system: (i) the hosted service computing system may be herein referred to as a "multitenancy shared computing system;" and (ii) the larger hosted service computing environment may be herein referred to as a "multitenancy shared computing environment."

In a hosted service multitenancy shared computing environment, a single resource can serve multiple tenants which share the single resource. According to one example, a computing node provided by a physical computing node such as a physical server can host a plurality of different applications associated to multiple different tenants, the multiple different tenants defined by different enterprises. According to Request for Comments 7364 published by Internet Engineering Task Force (IETF) (2014), "Multi-tenancy data centers are ones where individual tenants could belong to a different company (in the case of a public provider) or a different department (in the case of an internal company data center). Each tenant has the expectation of a level of security and privacy separating their resources from those of other tenants."

According to one virtualization architecture, a hypervisor can be hosted by a computing node OS that runs on a computing node. The hypervisor in turn can host multiple different guest OSs defining hypervisor based virtual machines (VMs) and service applications of different tenants can run respectively on the different guest OSs. According to one virtualization architecture, container based VMs can be hosted on a computing node OS running on a computing node.

In a hosted service multitenancy shared computing environment multiple different multiple computing nodes defined by physical computing node can be provided. Different computing nodes can be optimized for different services. A first computing node can host application of a first plurality of different tenants and a second computing node can host applications of a second plurality of tenants. The first plurality of tenants can include tenants of the second plurality of tenants.

A hosted service computing environment can include a centralized storage architecture. With a centralized storage architecture, a physical storage volume can be written to by multiple different servers, e.g. computing nodes provided by physical servers and virtual servers (e.g. VMs).

One example of a centralized storage architecture is a storage area network (SAN). SANs can provide a secure highspeed data transfer that provides access to consolidated block level storage. A SAN can make a physical storage volume accessible to multiple servers including physical servers and virtual servers. SAN devices can appear to a service as an attached storage device.

One challenge facing tenants of a hosted service computing environment is to avert overloading of tenant resources. Loading of tenant resources can be in dependence on data traffic through a tenant network. Data traffic through a tenant network can include client messaging data traffic, and logging data traffic.

SUMMARY

Shortcomings of the prior art are overcome, and additional advantages are provided, through the provision, in one aspect, of a method. The method can include, for example: collecting, by a distributed logging system, logging data generated by operation of a distributed computing system that is used by a plurality of tenants; storing, under control of the distributed logging system and via a storage path, the logging data as a plurality of files stored in a multi tier, shared volume storage system, with the storage of the logging data as a plurality of files including: dividing the plurality of files among and between a plurality of shared volume data structures, and organizing each shared volume data structure of the plurality of shared volume data structures according to a plurality of tiers; for each given file of the plurality of files; mapping, by a domain agent and in a mapping table data structure, an association between the given file and the shared volume data structure in which the given file is stored, and mapping, by the domain agent and in the mapping table data structure, an association between the given file and a file path through the tiers to identify a location where given file is stored; mounting, by a log analysis unit, in read only mode a first shared volume data structure of the plurality of shared volume data structures; and subsequent to the mounting, reading the logging data for a specified tenant of the plurality of tenants from the first shared volume data structure based upon the mappings of the mapping table.

According to one embodiment, the shared volume storage system can be used to separate logging data from client messaging data traffic by sending logging data to the shared volume storage system over an IP based tenant network. By separating logging data, loading of the IP based tenant network is reduced, and bursts in logging data traffic do not impact client messaging data traffic.

According to one aspect, at least one log data collection agent includes a first log collection agent that collects logging data of a first application of the first tenant, and a second log collection agent that collects logging data of a second application of a second application, the second application being hosted within a computing node stack so that the logging data includes first logging data of the first tenant and second logging data of the second tenant, wherein a storage system defines a storage volume associated to a computing node tenant, wherein the storage volume stores the first logging data of the first tenant within a first folder of the storage volume and the second logging data of the second tenant within a second folder of the storage volume.

According to one embodiment, a method for data organization is provided whereby logging data from multiple different tenants can be stored at a central location for access by a manager system that defines a domain agent and a log analysis unit. A manager system can in turn perform various different actions with respect to the logging data wherein the different actions can be in dependence on configuration selections of administrator users of different tenants. The different actions can include use of the IP based tenant network with reduced network bandwidth consumption.

In another aspect, a computer program product can be provided. The computer program product can include a computer readable storage medium readable by one or more processing circuit and storing instructions for execution by one or more processor for performing a method. The method can include, for example: collecting, by a distributed logging system, logging data generated by operation of a distributed computing system that is used by a plurality of tenants; storing, under control of the distributed logging system and via a storage path, the logging data as a plurality of files stored in a multi tier, shared volume storage system, with the storage of the logging data as a plurality of files including: dividing the plurality of files among and between a plurality of shared volume data structures, and organizing each shared volume data structure of the plurality of shared volume data structures according to a plurality of tiers; for each given file of the plurality of files; mapping, by a domain agent and in a mapping table data structure, an association between the given file and the shared volume data structure in which the given file is stored, and mapping, by the domain agent and in the mapping table data structure, an association between the given file and a file path through the tiers to identify a location where given file is stored; mounting, by a log analysis unit, in read only mode a first shared volume data structure of the plurality of shared volume data structures; and subsequent to the mounting, reading the logging data for a specified tenant of the plurality of tenants from the first shared volume data structure based upon the mappings of the mapping table.

In a further aspect, a system can be provided. The system can include, for example a memory. In addition, the system can include one or more processor in communication with the memory. Further, the system can include program instructions executable by the one or more processor via the memory to perform a method. The method can include, for example: collecting, by a distributed logging system, logging data generated by operation of a distributed computing system that is used by a plurality of tenants; storing, under control of the distributed logging system and via a storage path, the logging data as a plurality of files stored in a multi tier, shared volume storage system, with the storage of the logging data as a plurality of files including: dividing the plurality of files among and between a plurality of shared volume data structures, and organizing each shared volume data structure of the plurality of shared volume data structures according to a plurality of tiers; for each given file of the plurality of files; mapping, by a domain agent and in a mapping table data structure, an association between the given file and the shared volume data structure in which the given file is stored, and mapping, by the domain agent and in the mapping table data structure, an association between the given file and a file path through the tiers to identify a location where given file is stored; mounting, by a log analysis unit, in read only mode a first shared volume data structure of the plurality of shared volume data structures; and subsequent to the mounting, reading the logging data for a specified tenant of the plurality of tenants from the first shared volume data structure based upon the mappings of the mapping table.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4 depicts a log file table according to one embodiment;

FIG. 6 depicts a decision data structure for return of log data action decision according to one embodiment;

DETAILED DESCRIPTION

Figure 1A:
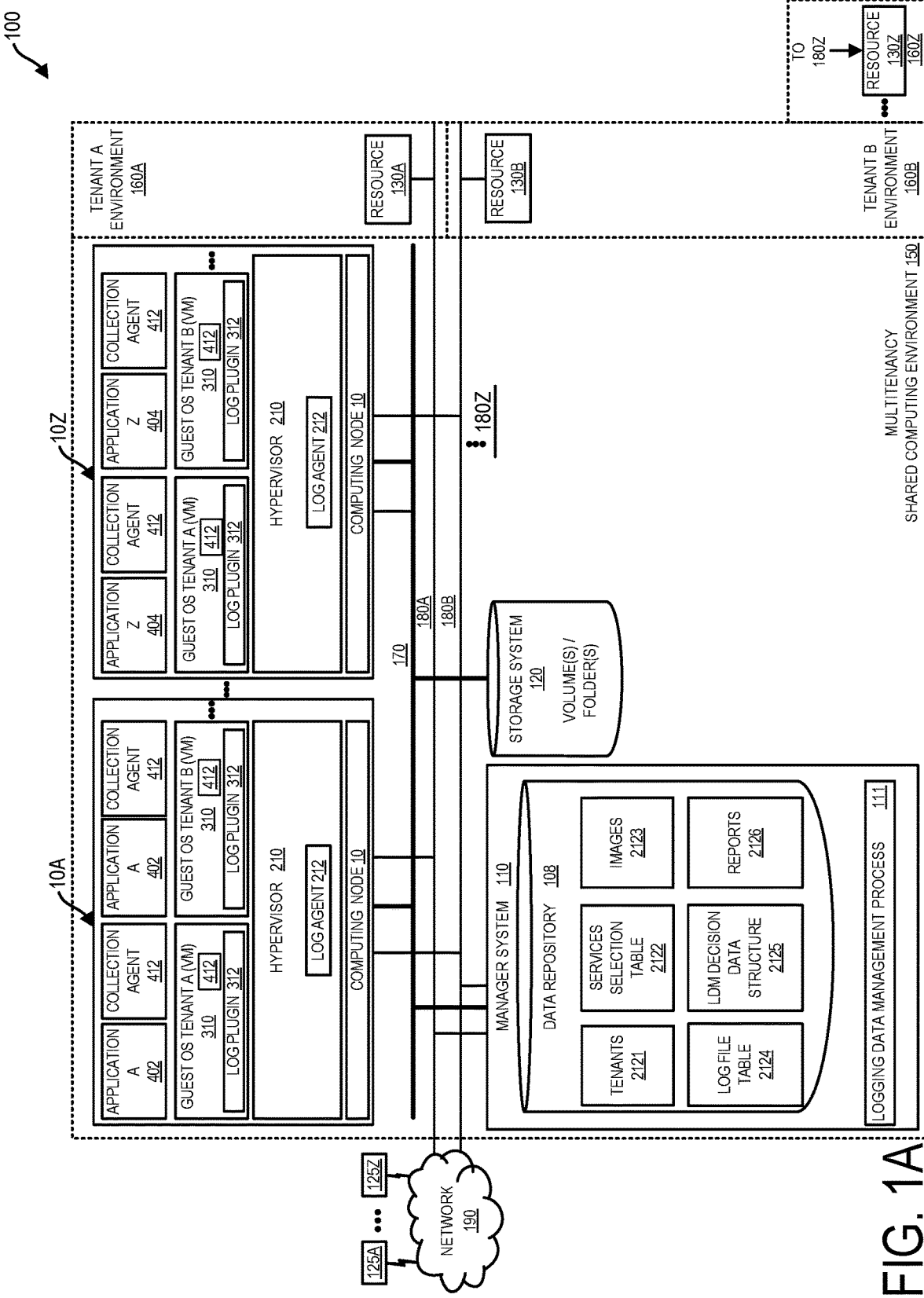
FIG. 1A is a block diagram depicting a system having a manager system, a storage system disposed within a shared computing environment in which services of multiple tenants are hosted according to one embodiment.

System 100 for hosting of services and storage of logging data is shown in FIG. 1A. System 100 can include manager system 110 having an associated data repository 108, computing node stacks 10A-10Z, storage area network (SAN) 170, storage system 120, tenant networks 180A-180Z associated to respective enterprises, clients 125A-125Z in communication with tenant networks 180A-180Z through network 190 and manager system 110 having an associated data repository 108.

System 100 can include a multitenancy shared computing environment 150 shared by multiple tenants, e.g. tenants A to Z having respective tenant networks 180A-180Z. Multi-tenancy shared computing environment 150 can host resources of multiple different tenants. In one embodiment a computing node of computing nodes 10 can host resources of multiple tenants. In one embodiment, respective computing nodes 10 can host resources of respective different tenants. Resources can include system software and/or application software of a tenant. Multitenancy shared computing environment 150 can be provided e.g. by a data center. Computing nodes 10 depicted in FIG. 1A can define compute hosts. Computing nodes 10 depicted in FIG. 1A can be provided by physical computing nodes.

Tenant network 180A can be partially disposed in multitenancy shared computer environment 150A and tenant A environment 160A. Tenant network 180B can be partially disposed in multitenancy shared computing environment 150A and tenant B environment 160B. Remaining tenant environments of tenant environments 160A-160Z can be configured similarly to tenant environment 160A and tenant environment 160Z. Tenant A environment 160A can be single tenant environment operated by tenant A. Tenant B environment 160B can be a single tenant environment operated by tenant B. Tenant A environment 160A can be provided, e.g., by a local area network operated by tenant A. Tenant B environment 160B can be provided, e.g. by a local area network operated by tenant B.

One or more resource 130A of tenant environment 160A can be disposed in tenant A environment 160A and can be connected to one or more computing node stack 10A-10Z by tenant network 180A. One or more resource 130B disposed in tenant B environment 160B can be connected to one or more computing node stack 10A-10Z by tenant network 180B. One or more resource 130Z disposed in tenant Z environment 160Z can be connected to one or more computing node stack 10A-10Z by tenant network 180Z. Shown as being disposed in respective tenant environments 160A-160Z, respective one or more resources 130A-130Z can alternatively be partially or entirely disposed in multitenancy shared computing environment 150.

Tenant networks 180A-180Z according to one embodiment can be provided by IP based networks (e g running TCP or UDP over IP), and in one embodiment, tenant networks of tenant networks 180A-180Z can be provided by overlay TCP/IP networks.

Storage area network (SAN) 170 can provide a secure highspeed access to centralized consolidated block level storage. SAN 170 can make storage system 120 accessible by multiple servers provided by physical servers and virtual servers. Storage system 120 connected by SAN 170 can appear to a host server as an attached storage device. Storage system 120 according to one embodiment can be a physical storage system provided e.g. by one or more of (a) a hard drive; (b) a disk array, and/or (c) an array of solid state drives (SSDs).

According to one embodiment, SAN 170 can transfer blocks of data using the Fibre Channel (FC) transfer protocol. FC can provide high speed, in order, lossless delivery of raw block data. FC can run on e.g. optical fiber cables and/or copper cabling. Aspects of FC are set forth in Request for Comments (RFC) 4044 published by The Internet Society. SAN 170 configured to transfer data via FC can define a Fibre Channel Network.

The transport protocol Fibre Channel Protocol (FCP) can transport Small Computer System Interface (SCSI) commands over FC. FCP addresses the need for fast transfers of large volumes of information. FCP is optimized to handle storage data traffic. FCP is a transport protocol that does not run on top of the Internet Protocol (IP). FCP is a relatively thinner, dedicated protocol that generally results in a lower switching latency than a transport protocol running on top of IP. Among its characteristics FCP includes a built-in flow control mechanism that ensures data is not sent to a storage device or service that is not ready to receive the data.

According to one embodiment, SAN 170 can be provided by an IP based network and the Internet Small Computer Systems Interface (iSCSI) protocol can be used to carry SCSI commands over TCP/IP.

According to one embodiment, system 100 can include a shared volume file system (e.g. a shared disk file system) built on top of storage system 120. The shared volume file system can define within storage system 120 one or more volume. Each volume can be an identifiable area of a physical storage system that is accessible by a logical interface of a system software layer (e.g. a logical interface of hypervisor 210 of FIG. 1A or computing node OS 311 of FIG. 1B running on computing node 10 provided by a physical computing node. In the case that storage system 120 includes partitions, volumes of storage system 120 can map to partitions, but volumes herein need not map to partitions. A shared file system according to one embodiment can associate each volume within storage system 120 to one computing node of multitenancy shared computing environment 150 and can associate each folder within each volume to one tenant.

Referring to FIG. 1A, system 100 can be configured so that tenant data traffic other than logging data traffic can be transmitted over tenant networks 180A-180Z and can be configured further so that logging data traffic generated in dependence on performance of a tenant application of a tenant is separated from tenant data traffic transmitted over a tenant network and is transmitted to storage system 120 via SAN 170. Tenant data traffic transmitted on tenant networks 180A-180Z can include client messaging data traffic. Client messaging data traffic can include data messages from clients 125A-125Z to respective applications hosted within computing node stacks 10A-10Z and return data messages to clients 125A-125Z. Clients 125A-125Z can be associated to customer users of a tenant service. Client messaging data traffic can include data messages from clients defined by tenant resources to respective applications hosted within computing node stacks 10A-10Z and return data messages to such clients. Separating of logging data traffic so that logging data flows to storage system 120 via SAN 170 provides a plurality of advantages. For example, a burst in logging data traffic will not impact client messaging data traffic, and a burst in client messaging data traffic will not impact the collection of logging data. Security checking is made more granular and a double pay issue can be avoided.

Manager system 110 can be provided by a computing node based system connected to computing nodes 10 and computing node stacks 10A-10Z by SAN 170 or alternatively can be connected to computing nodes 10 and computing node stacks 10A-10Z by SAN 170 by a manager service network which can be IP based. Data repository 108 of manager system 110 which is logically associated to manger system can be provided e.g. by a network attached storage device (NAS) or can be provided by a volume of storage system 120.

Embodiments herein recognize that according to a currently available tenant network logging service, logging data is sent over a tenant network provided by an IP based network. In a currently available scheme a logging data collection agent defined within an application layer hosted on a computing node stack generates logging data and sends logging data to a tenant resource over a tenant network. For example, with reference to FIG. 1A, logging data according to a currently available tenant network logging service can be transmitted from a tenant collection agent at an application layer hosted within a computing node stack over tenant network 180A to a resource of one or more resource 130A.

The resource of the one or more resource 130A that stores tenant logging data can be a tenant logging data repository connected to tenant network 180A. According to the currently available tenant network logging service logging data can be transmitted over tenant network 180A, through which client messaging data traffic can also be transmitted, e.g. from and to clients 125A-125Z. Embodiments herein recognize that logging data traffic can greatly impact the performance of tenant network 180A. Bursts in logging data traffic can render customer service unavailable and bursts in client messaging data traffic can negatively impact the delivery of logging data to a resource 130A.

System 100 as shown in FIG. 1A can include features so that logging data can be transmitted to storage system 120 via SAN 170 without use of a tenant network 180A. Logging data can thus be separated from client messaging data traffic transmitted over a tenant network 180A. Accordingly, bursts in logging data traffic will not impact delivery of client messaging data traffic over tenant network 180A and bursts in client messaging data traffic over tenant network 180A will not impact the storage of logging data in storage system 120.

Referring to further aspects of system 100, manager system 110 can have features for managing and processing logging data that can be stored in storage system 120. Manager system 110 can include data repository 108 and can run logging data management process 111.

Data repository 108 can store various data. In tenants area 2121, data repository 108 can store data on tenants running applications hosted within multitenancy shared computing environment 150. Tenants may use multitenancy shared computing environment 150 to provide services, e.g. to one or more resource of the tenant and/or to users such as users of clients 125A-125Z which users can be customers of a tenant who use a tenant service hosted by multitenancy shared computing environment.

Services provided with use of multitenancy shared computing environment 150 can include, e.g. audio/video server services, chat server services, FTP server services, group server service, IRC server services, news aggregator services, and webserver services to name a few. Each tenant can be a different enterprise and can provide one or more service. Each tenant can have associated customers who send customer traffic from clients over a respective tenant network of tenant networks 180A-180Z associated to that tenant.

Data repository 108 in services selection table area 2122 can store a table that specifies services being provided by respective tenants with use of multitenancy shared computing environment 150 and logging data services associated with the respective service. System 100 can be configured so that an administrator user associated to a respective tenant can select a logging data process associate to respective services. Logging data processes can include, e.g. a storage area network (SAN) data logging process and a tenant network data logging process. Selection of a SAN data logging service specifies that storage system 120 connected by SAN 170 to a computing node 10 is to be used for the storage of logging data. Tenant network logging data process specifies that logging data is to be transmitted over a tenant network, e.g. tenant network 180A for storage into a tenant resource, e.g. a resource of one or more resource 130A.

Data repository 108 in images area 2123 can store images for the installation, e.g. of system software and/or application software for the providing of services. System 100 can be configured to install system software such as hypervisor 210 as well as guest OSs or containers defining virtual machines (VMs). VMs can be provided, e.g. by hypervisor based virtual machines and/or container based virtual machines. Images area 2123 can include images for the installation of application layer software, e.g. for the instantiation of one or more programs defining an application and/or one or more application layer collection agent for the generation of logging data.

Data repository 108 in log file table area 2124 can store a log file table specifying filenames for storing of logging data. The filenames can be associated to directories within the log file table and the directories can be mapped to respective tenants. The filenames can be associated to volumes within the log file table and the volumes can be mapped to computing nodes 10 provided by physical computing nodes.

Data repository 108 in logging data management (LDM) decision data structure area 2125 can store a logging data management decision data structure that specifies logging data management actions that are to be performed for different log file classifications or log file identifiers. The different classifications and identifiers can be specified or be in dependence, e.g. on selections by an administrator user of a tenant.

Data repository 108 in reports area 2126 can store reports generated based on processing of logging data. The reports stored in area 2126 can include datasets that are lightweight as compared to log files defined by raw logging data.

Manager system 110 can run logging data management process 111. Manager system 110 running logging data management process 111 can include manager system 110 examining an action decision specified in a logging data management decision data structure stored in area 2125 and performing the action specified. In some cases, the action can be to generate a report for sending to a tenant resource over a tenant network. In some cases, the action can be to process log file logging data for detection of an alarm condition and for sending an alarm notification to a tenant resource over a tenant network.

Computing node stacks 10A-10Z can be configured to support logging functions herein, wherein logging data is separated from tenant network data traffic (FIG. 1A). Computing node stacks 10A-10Z are configured to define VMs provided by hypervisor based VMs. The respective computing node stacks of computing node stacks 10A-10Z can include a computing node 10, a hypervisor 210 running on the computing node 10, guest OSs 310 for respective tenants, e.g. tenant A and tenant B running on hypervisor 210, and one or more collection agent 412 running on the respective guest OSs 310.

Features for providing logging functionality as set forth herein can be provided with use of log agent 212 operating in a coordinated manner with log plugin 312 and collection agent 412. Log agent 212 and log plugin 312 can be defined within a system software layer. For example, log agent 212 can be defined within the virtualization layer provided by hypervisor 210 and log plugin 312 can be defined within a guest OS 310. Collection agent 412 can be provided by application layer software running on guest OS 310.

In the computing node stack architectures depicted in FIG. 1A, guest OSs 310 define VMs. The virtual computing node stacks can be configured for optimization for providing different services, which different services can be defined differently by application 402 and different application 404. The different services defined can include, e.g. audio/video server services, chat server services, FTP server services, group server service, IRC server services, news aggregator services, and webserver services to name a few.

With the architecture depicted in FIG. 1A, each guest OS 310 can have one or more associated application and one or more collection agent 412. Collection agent 412 can be defined within a system layer, e.g. within guest OS 310 and/or can be defined within an application layer running on a respective guest OS 310. Guest OS 310 can generate logging data such as logging data in accordance with the syslog logging standard defined in Internet Engineering Taskforce (IETF) set forth in Request for Comments (RFC) 5424. Logging data can include, e.g. operating system event logging data, application event logging data, transaction logging data, and/or message logging data. Application logging data can include logging data that specifies application events such as application errors, informational events and warnings.

Operating system event logging data generated by collection agent 412 can include e.g. scheduler events, device driver events, and other system level events. Application event logging data generated by collection agent 412 can reveal message flow issues and application problems. It can also include information about user and system events that have occurred with respect to an application. Application events can include e.g. an operation that has been carried out, error events such events specified that an application has failed to start, security events such as successful logon or unsuccessful logon events. Application event logging data can define an audit trail that can be later analyzed. Transaction logging data can specify e.g. content, or time of transactions made by a user from a client to a server. For Web searching, a transaction log is an electronic record of interactions that have occurred during a searching episode between a Web search engine and users searching for information on that Web search engine. Message logging data can specify e.g. system/server messages and entries related to channel and user changes (e.g. topic change, friendly name changes, user status changes, user joins, user exits, user bans).

With the architecture depicted in FIG. 1A, there can be running on each respective hypervisor 210 one or more guest OS 310. The respective guest OSs can respectively be associated with different tenants.

Returning to the description of logging functions, a log plugin 312 running on guest OS 310 can read logging data generated by collection agent 412 and can write such logging data to log agent 212 of hypervisor 210. Logging data received by log agent 212 can include the reference to a filename. Log agent 212 can use a log file table stored in log file table area 2124 to determine a folder and volume location associated with the filename and can write the received logging data to an appropriate folder and volume within storage system 120. Log agent 212 can create folders and volumes within storage system 120 in accordance with prescribed folder and volume creation rules.

Figure 1B:
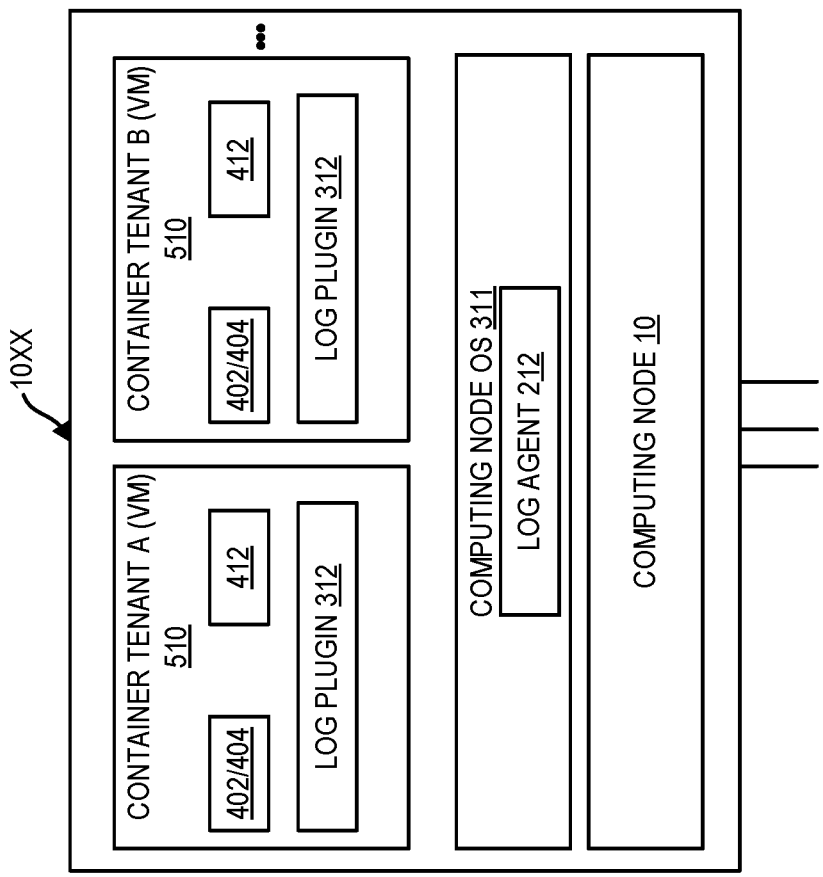
FIG. 1B is a block diagram depicting a virtualization architecture that can be incorporated into a shared computing environment according to one embodiment.

FIG. 1B depicts features for logging as set forth herein implements with use of an alternative virtualization architecture. As set forth in connection with FIG. 1B, hypervisor based VM architecture can be replaced with a container based VM architecture. Any of computing node stacks 10A-10Z, as shown in FIG. 1A, can be replaced with a computing node stack 10XX as depicted in FIG. 1B, wherein computing node stack 10XX defines container based VMs. Computing node stack 10XX can include computing node OS 311 running on computing node 10 and respective containers 510 running on computing node OS 311. Respective containers 510 can be associated respectively to different tenants, e.g. tenant A to tenant Z. Log agent 212 defined within hypervisor 210 in the embodiment of FIG. 1A can be defined within a different system software layer. Log agent 212 can be defined within computing node OS 311 of computing node stack 10XX within the architecture shown in FIG. 1B. Further, log plugin 312 shown as being defined within a guest OS in the embodiment of the FIG. 1A can be defined within a different system software layer such as an OS modification layer of container 510 within the architecture of FIG. 1B. Collection agent 412 (described in FIG. 1A as being built on top of a guest OS) with the architecture of FIG. 1B can be defined within an OS modification layer or and application layer of respective container 510, which application layer of respective container 510 can define an application for providing a certain service as set forth herein. In FIGS. 1A and 1B, the virtual machines (VMs), i.e. hypervisor based VMs or container based VMs define computing nodes in the form of virtual computing nodes. Computing nodes 10 depicted in FIG. 1B can define compute hosts. Computing nodes 10 depicted in FIG. 1B can be provided by physical computing nodes.

Figure 2:
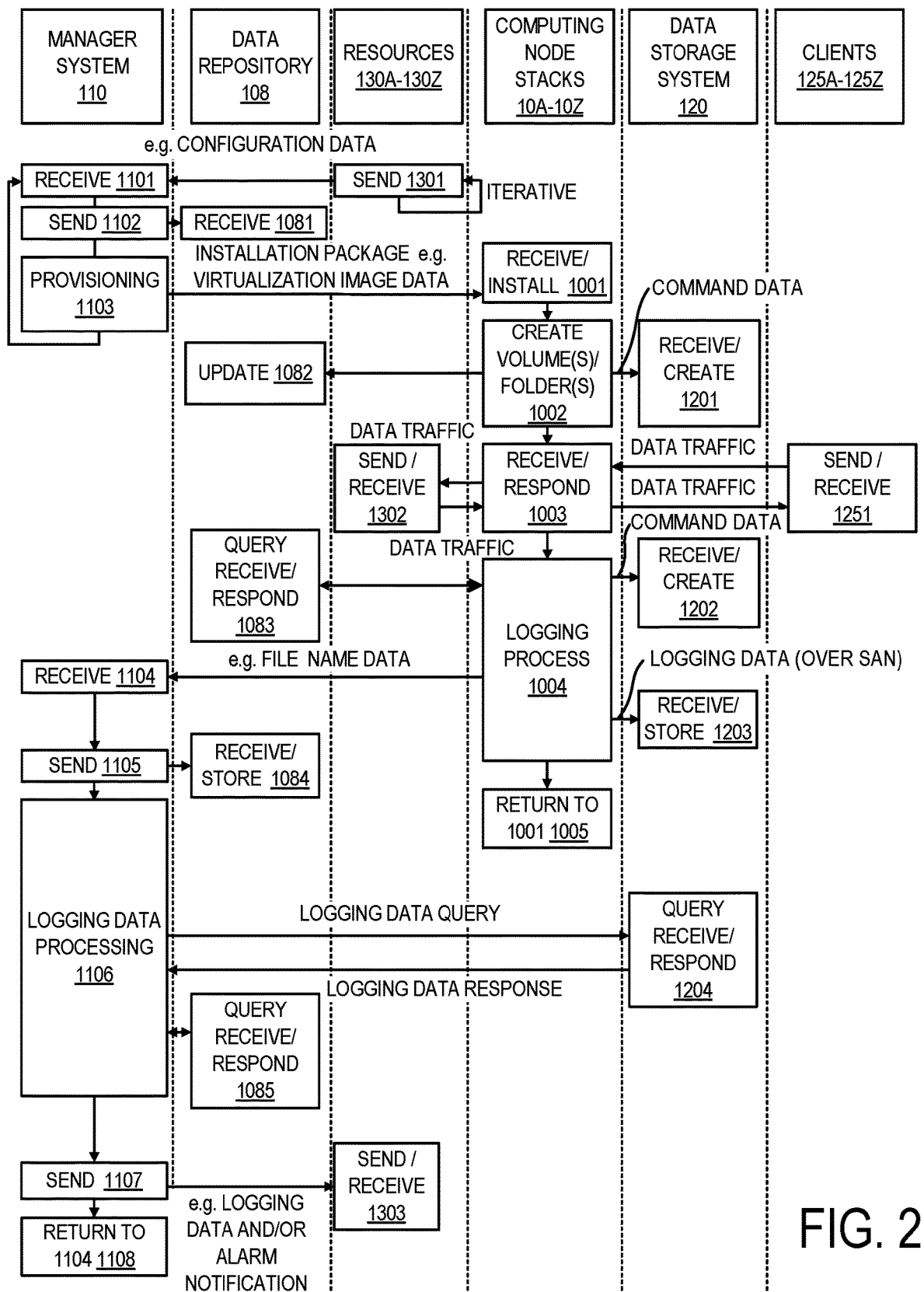
FIG. 2 is a flowchart illustrating a method for performance by a computing node stack interoperating with a manager system and other components according to one embodiment.

A method for performance by computing node stacks 10A-10Z interoperating with manager system 110, resources 130A-130Z, and clients 125A-125Z is set forth in reference to the flowchart of FIG. 2. There is set forth herein, a method that includes deploying in a hosted service computing system, a log agent instantiation such that a log agent 212 is running in the system software layer of the computing node stack representation of the hosted service computing system; deploying in the hosted service computing system, a log data collection agent instantiation; deploying, in the hosted service computing system a first instantiation of application 402, with the first instantiation of the application 402 being reserved for the use of a first tenant (e.g. tenant A) of a plurality of tenants of the hosted service computing system; receiving, by the log agent instantiation and from the log data collection agent instantiation, first application logging data that is generated by operations of the first instantiation of the first application and collected by the log data collection agent instantiation; and storing, by the log agent 212, the first application logging data in a storage area network (SAN) type storage system, e.g. which can be provided by storage system 120.

At block 1301, resources 130A-130Z can be iteratively sending configuration data to manager system 110 for receipt by manager system 110 at block 1101. Configuration data can be sent at block 1301 and can be sent over respective tenant networks of tenant networks 180A-180Z which can be IP based tenant networks. Configuration data sent at block 1301 can be configuration data to define services hosted within multitenancy shared computing environment 150. Resources 130A-130Z according to one embodiment include respective administrator client computer devices that display administrator user interface 3000 as shown in FIG. 3.

Using administrator user interface 3000 an administrator user associated to a tenant enterprise can define services selection configuration data, logging service selection configuration data, and logging data management configuration data. Referring to FIG. 3, area 3010 permits an administrator user associated to a tenant enterprise to specify services to be hosted within multitenancy shared computing environment 150.

Using area 3020, an administrator user can specify a logging data service associated to each respective service. For example, an administrator user using area 3020 can specify whether logging data is to be sent over SAN 170 to storage system 120 and separated from customer data traffic of a tenant, e.g. tenant traffic or customer traffic using storage system 120, or alternatively whether data logging is to be performed by sending logging data over respective tenant network 180A-180Z. Using area 3020 an administrator user can also make selections as to logging data that is to be generated, e.g. event logging data, transaction logging data, messaging logging data.

Figure 3:
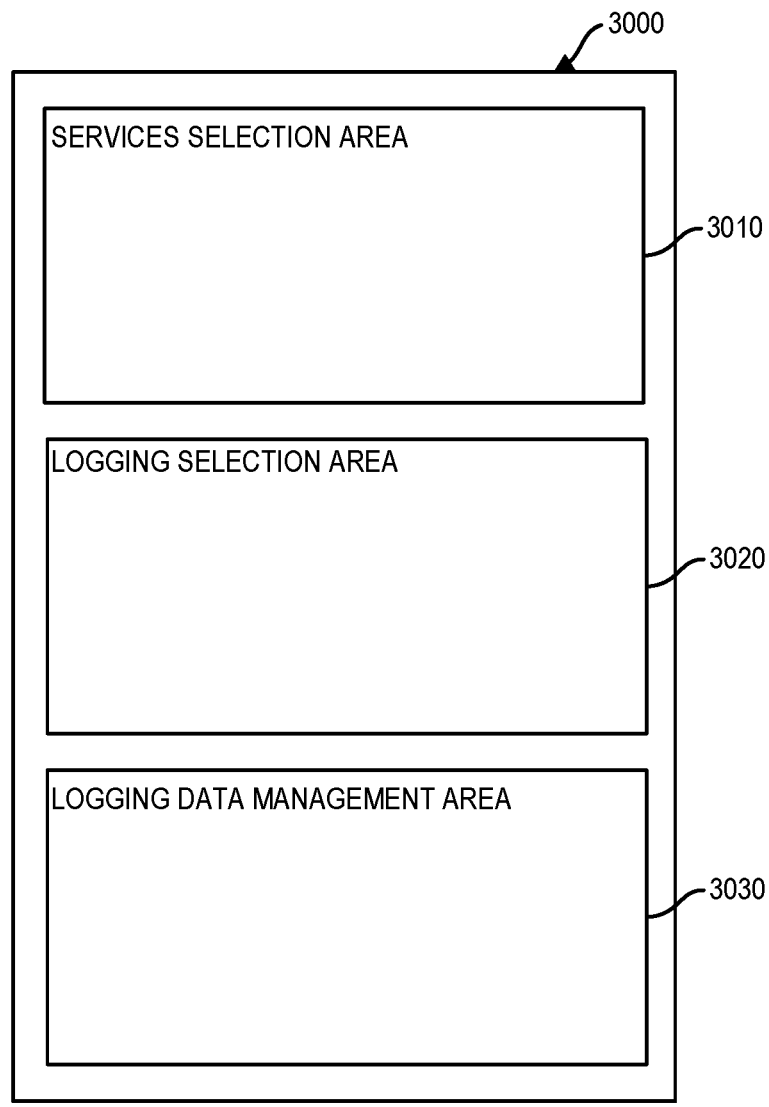
FIG. 3 is a depicts an administrator user interface for display on an administrator client computer device of a tenant environment according to one embodiment.

Using area 3030 of user interface 3000 as depicted in FIG. 3, an administrator user can specify logging data management actions to be performed with reference to each service defined for a tenant. Logging data management options can include, e.g. sending one or more lightweight logging data report in lieu of sending logging data, e.g. sending logging data provided by full weight raw logging data when an intensity of client messaging data traffic of a tenant network is below a low threshold and/or sending logging data in responsive to a request received from a respective tenant resource 130A-130Z. In response to receipt of configuration data at block 1101, manager system 110 can proceed to block 1102.

At block 1102 manager system 110 can send configuration data for receipt by data repository 108 at block 1081. Received configuration data can be processed by manager system 110 for updating services selection table stored in services selection table area 2122 and for updating logging data management decision stored in logging data management decision data structure area 2125. A services selection table of services selection area 2122 can specify the selected services of respective tenants which are to be hosted by multitenancy shared computing environment 150 as well as the data logging services associated to such services. The logging data management table can specify administrator user selected data logging actions associated with respective services of respective tenants hosted by multitenancy shared computing environment 150.

The service of a tenant as set forth herein can map to an application 402 or 404 as set forth in FIGS. 1A and 1B. As set forth herein, respective computing node stacks 10A-10Z can be respectively optimized, e.g. resourced for providing a certain service. For example, computing node stack 10A can be optimized for providing a database service and computing node stack 10Z can be optimized for providing another service, e.g. a real time messaging service. The optimizations can be for alternative services set forth herein.

Returning to the flowchart of FIG. 2, manager system 110 on completion of block 1102 can proceed to block 1103. At block 1103, manager system 110 can perform provisioning of one or more computing node stack 10A-10Z. Manager system 110 performing provisioning block 1103 can include manager system 110 examining data of a services selection table stored in services selection table area 2122 to ascertain requirements for services to be hosted by multitenancy shared computing environment 150 as well as logging data services associated to such services. In response to a determination that one or more computing node stack 10A-10Z requires provisioning (which determination can be in dependence on processing of control and/or event data), manager system 110 at provisioning block 1103 can send an installation package for receipt and installation by the one or more computing node stack 10A-10Z at block 1001. An installation package can include, e.g. libraries and executable code for defining logging data functions as set forth herein. The installation package can include system software and application software from images area 2123 of data repository 108. For providing the data logging functions set forth herein, installation images can include code for defining the function of log agent 212 log plugin 312 and logging data collection agent 412.

In some embodiments, installation at block 1001 can include installation of all software layers defining computing node stack. In some embodiments, some software layers defining a computing node stack may have been preinstalled and installation at block 1001 can include installation of a subset of layers defining a computing node stack. On completion of block 1001 a computing node stack, e.g. computing node stack 10A can proceed to block 1002.

At block 1002, computing node stack 10A can create volumes and folders for the storing of log files. According to one embodiment, log agent 212 when installed can be configured to apply prescribed rules for the creation of volumes and folders within storage system 120. Thus, according to one embodiment a respective log agent 212 can create one or more storage volume for each hypervisor 210. According to one embodiment, while each volume created within storage system 120 can mount to a single hypervisor 210, log agent 212 can create more than one volume per hypervisor. According to one embodiment, log agent 212 can be configured to create an additional storage volume for its respective hypervisor in response to the determination that more storage space is required. At create volumes/folders block 1002 log agent 212 of computing node stack 10A can create folders within a volume on a per tenant basis so that respective folders within a folder are assigned to respective tenants.

For example, log agent 212 can create within a volume mapping to a certain hypervisor, a single folder for each tenant hosted by the certain hypervisor. At block 1002, log agent 212 can send command data to storage system 120 for creation of volumes and/or folders for storage of log files. Responsively to the command data received at block 1201, storage system 120 can create the volumes and/or folders for the storage of log files. The log agent 212 at block 1002 can also send update data to data repository 108 for updating the log file table stored in log file table area 2124. A log file table of log file table area 2124 can store mapping data that maps folders, e.g. tenant specific folders that have been created within storage system 120 to the respective volumes associated to such folders and can also map additional data such as filenames associated to folder which are associated to volumes.

At block 1003, a computing node stack 10A, e.g. in a deployed state, can receive and respond to request messages from clients of clients 125A-125Z which can be sending request messages to computing node stack 10A at block 1251. At block 1003, a computing node stack 10A, e.g. in a deployed state, can receive and respond to request messages from one or more resource of resources 130A-130Z which can be sending request messages to computing node stack 10A at block 1302. The received request messages and responsive response messages from and to clients of clients 125A-125Z can define client messaging data traffic provided by customer traffic. Client messaging data traffic can define workload traffic which according to system 100 can be separated from logging data traffic.

In the process of receiving and responding to requests at block 1003, a computing node stack, e.g. 10A, e.g. by one or more collection agent 412 can generate logging data. At block 1004, computing node stack 10A can perform a logging process. With reference to FIG. 1A, the logging process at block 1004 can include interactions amongst a variety of functional components such as log agent 212, log plugin 312, and collection agent 412. At block 1004, the log plugin such as log plugin 312 associated with the tenant A guest OS 310 can be reading logging data from its associated collection agent 412 and writing such logging data to hypervisor 210 having log agent 212. The received logging data read by log plugin 312 can include a reference to a filename sent by collection agent 412. Collection agent 412 can be configured to assign filenames according to a prescribed process. A prescribed process can include e.g. that a new filename is assigned on starting an application a first time after installation. A prescribed process can include e.g. that a new filename is assigned with each restart of an installed application. A prescribed process can include, e.g. that a new filename is assigned for each new predefined time period, e.g. for each new hour, day, week, etc.

Referring further to the logging process of block 1004, each respective log plugin 312 associated to hypervisor 210, e.g. of computing node stack 10A can send logging data with filename data to a certain open socket of hypervisor 210. The open socket can be provided, e.g. by a UNIX socket. Log agent 212 of hypervisor 210 at logging process block 1004 can be examining logging data with filename data of each open socket of hypervisor 210. Log agent 212 can determine a filename for received logging data by reading the filename associated to the received logging data. Log agent 212 can determine a location within storage system 120 of the log file identified by the filename using a log file of log file table 2124 of data repository 108. A representation of log file table 4000 stored in log file table area 2124 is depicted in FIG. 4.

Log file table 4000 as depicted in FIG. 4 can cognitively map filenames with storage path information defined by folder and volume location associated to such filenames as well as tenant associations to the various filenames. Log agent 212 can receive log messages with referenced filenames. In response to receiving a filename by examination of an open socket, log agent 212, e.g. of computing node stack 10A, with use of log file table 4000 can determine the folder and volume location of the log file identified by the filename and at block 1004 can write and store the logging data received to the appropriate log file within storage system 120 over SAN 170, which can receive and store the logging data at block 1203.

Log agent 212 at block 1004 can perform iterative data queries of data repository 108, e.g. for reading of data of log file 4000 as depicted by query receive and respond block 1083 of data repository 108. In some use cases, a filename read from an open socket of a hypervisor by log agent 212 may not be specified as a filename on log file table 4000 meaning that a log file for the filename has not yet been created within storage system 120. In such a scenario, log agent 212 at block 1004 can send command data for receipt by storage system 120 to create the new log file under the appropriate tenant specific folder and within a hypervisor specific volume of storage system 120. Log agent 212, further in such a scenario at block 1004, can send command data to manager system 110 having data repository 108 for updating of log file table 4000 to include a new Row specifying the new filename as well as the folder, volume, and tenant associations with the new filename. Manager system 110 depicted in FIG. 1A can define a domain agent and log analysis unit.

Referring to log file table 4000 as shown in FIG. 4, log file table 4000 can include additional data. For example, a log file table can include column X that specifies a log file classification for each log file identified by a unique filename. Different classifications can be specified, e.g. based on the service type associated to the application for which logging data is being generated and/or can include different classifications in dependence on attributes of the logging data (e.g. based on whether the logging data is operating system event logging data, application event logging data, transaction logging data or message logging data). The classifications can be single attribute (e.g. specifying just the service type or just the logging data type) or can be multi attribute (e.g. specifying service type with logging data type). Log agent 212 for creating files, folders, and volumes within storage system 120 can adhere to various prescribed rules.

Figure 5:
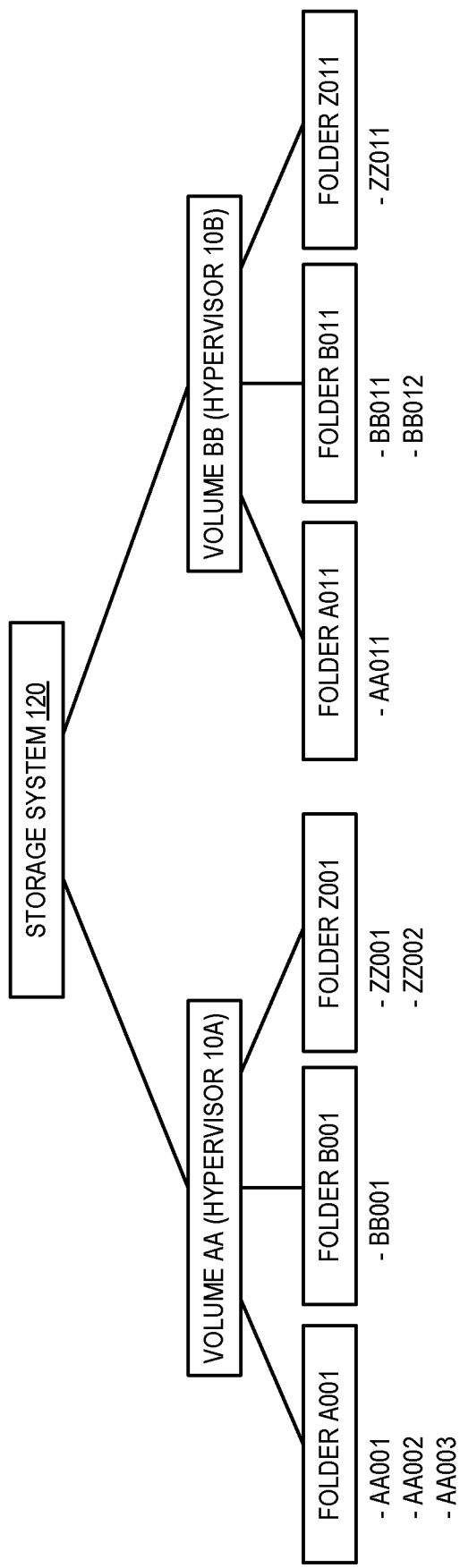
FIG. 5 depicts a tiered organization of files, folders, and volumes within a storage system according to one embodiment.

FIG. 5 depicts a tiered log file storage structure for storing log files according to one embodiment in accordance with the log file data of log file table 4000 as described in FIG. 4. Referring to FIG. 5, storage system 120 based on command data received from different log agents 212 associated to different hypervisors 210 can be configured so that different volumes are created for different hypervisors associated respectively to different computing node stacks 10A-10Z each having a different respective computing node 10 provided by a physical computing node. There is set forth herein according to one embodiment storing, under control of the distributed logging system and via a storage path, the logging data as a plurality of files stored in a multi tier, shared volume storage system, with the storage of the logging data as a plurality of files including: dividing the plurality of files among and between a plurality of shared volume data structures, and organizing each shared volume data structure of the plurality of shared volume data structures according to a plurality of tiers; for each given file of the plurality of files; mapping, by a domain agent and in a mapping table data structure, an association between the given file and the shared volume data structure in which the given file is stored, and mapping, by the domain agent and in the mapping table data structure, an association between the given file and a file path through the tiers to identify a location where given file is stored; mounting, by a log analysis unit, in read only mode a first shared volume data structure of the plurality of shared volume data structures; and subsequent to the mounting, reading the logging data for a specified tenant of the plurality of tenants from the first shared volume data structure based upon the mappings of the mapping table.

For each tenant having an application hosted by a certain hypervisor there can be created a different folder. For each respective folder associated to a respective tenant, there can be stored one or more different log files.

In response to receipt of filename data at block 1104 from a log agent 212, manager system 110 can send the filename data for receipt and storage at block 1084 by data repository 108 for updating log file table 4000 as shown in FIG. 4. In addition, in response to the received filename data, manager system 110 at block 1104 can mount a new log file identified by the new filename as a read only volume.

With further reference to logging process block 1004, log agent 212, e.g. of computing node stack 10A, can send logging data for receipt and storage to the appropriate log file within the appropriate folder and under the appropriate volume by storage system 120 at block 1203. Log agent 212 at block 1004 can send logging data to storage system 120 over SAN 170 so that the transmitted logging data does not impact client messaging data traffic being transmitted over a tenant network 180A provided by an IP based network. Logging data sent by log agent 212 to storage system 120 can be timestamped to include the time of generation of the logging data by log collection agent 412, and/or can include a time of sending timestamp by log agent 212. In some embodiments, the time of generation timestamp, which can be provided close in time to the time of sending, can serve as a time of sending timestamp.

Log agent 212 in response to completion of block 1004, e.g. after writing new logging data to an appropriate log file within storage system 120 can return to block 1001, wherein log agent 212 and/or other components of computing node stack 10A, in the described example, can iteratively perform blocks 1101-1105, including appropriate instances creating new log files, new folders, e.g. in the case a new installation package relates to a new tenant, and/or new volumes, e.g. capacity of an existing volume for a certain hypervisor is exceeded.

Manager system 110 in response to receipt at block 1104 and on completion of block 1105 can proceed to block 1106. At block 1106 manager system 110 can perform logging data processing. Manager system 110 performing logging data processing block 1106 can include manager system 110 activating logging data management process 111 as explained in reference to FIG. 1A. Manager system 110 at block 1106 can examine action decision data of a logging data management decision data structure such as decision data structure 6000 as shown in FIG. 6, which can be stored in logging data management decision data structure area 2125 as explained in reference to FIG. 1A.

At block 1106, manager system 110 using decision data structure 6000 can determine that one or more log data management action is to be taken. As indicated by the decision data structure 6000 of FIG. 6, different action decisions can be specified for different log files. For example, some log files can be specified for certain action, e.g. to be taken immediately upon an updating of a log file, whereas some log files can be specified for action at a time after updating of a log file.

Action decisions can include action decisions, e.g. to (a) perform monitoring of tenant network traffic and transmitting the logging data of a log file stored in storage system 120 in response to current tenant network traffic intensity falling below a threshold; (b) process data of a log file to return and send a report of relatively lighter weight over a tenant network provided by an IP based network in lieu of relatively heavier weight logging data provided by raw logging data, or (c) transmit the logging data of a log file on demand in response to a request received by a tenant resource.

Referring again to the log file table 4000 of FIG. 4, log agent 212 at block 1004, with the sending of filename tagged and timestamped logging data at block 1004 to storage system 120 can send the filename tag and the timestamp to manager system 110 for receipt by manager system 110 at block 1104. The timestamp can specify the time at which log agent 212 sent logging data to storage system 120 at block 1005. On receipt of filename data with a timestamp at block 1104, manager system 110 can update log file table 4000 (FIG. 4) so that column Y for the certain row associated to the filename of the received filename data is updated with the received timestamp. Accordingly, log file table 4000 for each filename specified, specified a time of most recent data logging. Thus, manager system 110 at any time in its operation, can examine column Y to determine times at which respective data logging files summarized in log file table 4000 have been written to.

Various types of action decisions that can be performed with respect to log files are described further with reference to the decision data structure 6000 of FIG. 6. The decision data structure 6000 of FIG. 6 specifies a differentiated action decision for each of several rows, and each row has a different set of firing conditions. Firing conditions can be specified in terms of one or more parameter value. For example, the action decision of row 1 can be fired for logging data where the logging data is written to a log file having a log file classification 00A, and where the tenant is tenant A. The action decision of row 7 can be fired for logging data written to a log file having the filename XX, and where the tenant is tenant A.

Action decisions can include action decisions, e.g. to (a) perform monitoring of tenant network traffic and transmitting the logging data of a log file stored in storage system 120 in response to current tenant network traffic intensity falling below a threshold (e.g. row 1); (b) process data of a log file to return and send a report of relatively lighter weight over a tenant network provided by an IP based network in lieu of relatively heavier weight logging data provided by raw logging data (e.g. row 2, row 3, row 4, row 5), (c) transmit the logging data of a log file on demand in response to a request received by a tenant resource (e.g. row 5, row 6), and/or (d) perform alarm condition processing. With an action decision returned at block 1106, manager system 110 can proceed to block 1107. At block 1107 manager system 110 can provide one or more output for performance of the action decision returned at block 1106. The one or more output can include e.g. sending log data over a tenant network to a tenant environment. The log data can include e.g. raw logging data, report data, and/or alarm data based on an alarm condition being detected. On completion of block 1107 manager system 110 can proceed to block 1108 wherein manager system 110 can return to block 1104. It can be seen that manager system 110 can be iteratively performing blocks 1104-1108.

Different tenants can specify different actions with respect to log files using logging data management area 3030 of administrator user interface 3000 as described in reference to FIG. 3. Logging data management area 3030 can be configured to allow an administrator user to both specify action decisions and to specify conditions to be associated to such action decision. Referring to FIG. 3 a tenant for an administrator can use area 3030 to specify action decisions such as those summarized in the decision data structure 6000 of FIG. 6 and to specify firing conditions associated to the action decision.

Referring to the action decision of row 1 of decision data structure 6000 of FIG. 6, one action decision can be the action decision to send log file logging data when tenant network traffic is below a threshold intensity. As noted, logging features herein can protect a tenant network from bursts and logging data activity by separating logging data so that logging data is transmitted over a storage area network to storage system 120 without being sent over a tenant network provided by an IP network.

However, embodiments herein recognize that logging data can be safely sent in some circumstances, e.g. without impact on a tenant network, when current data traffic of a tenant network is below a threshold intensity. According to row 1, manager system 110 can monitor data traffic of a tenant network and can send log file data to a resource of one or more resource 130A, when network traffic of tenant network 180A is below a threshold intensity.

Various processes can be employed for measuring a current data traffic volume of tenant network 180A. It has been described that log file table 4000 can be iteratively updated each time that log agent 212 to storage system 120 so that column Y includes timestamp value indicating a time at which each summarized file summarized in log file table was written to. Embodiments herein recognize that a frequency with which collection agent 412 generates logging data messages can vary in dependence on tenant network data traffic intensity. Accordingly, in one embodiment, manager system 110 determining network data traffic intensity can include manager system 110 examining a frequency of updates of log file table 4000. Manager system 110 can be configured to iteratively monitor a frequency of updates log file table 4000 for generating an iteratively updated network data traffic intensity value that specifies current network data traffic intensity.

The time at which manager system 110 in accordance with row 1 sends log file logging data over a tenant network e.g. tenant network 180A to one or more resource 130A can be a time on completion of writing of logging data into storage system 1202 by log agent 212 in the case that current tenant network traffic is below a certain threshold intensity. The time at which manager system 110 in accordance with row 1 sends log file logging data over a tenant network e.g. tenant network 180A to one or more resource 130A can be a time after a delay on completion of writing of logging data into storage system 1202 by log agent 212 in the case that current tenant network traffic is above the certain threshold intensity when the logging data is written into storage system 1202. In such a scenario, manager system 110 after delay from a time of writing of logging data to storage system 120 can send the logging data over a tenant network e.g. tenant network 180A to one or more resource 130A in response to the iteratively updated network traffic intensity parameter value falling below the threshold.

On completion of the reading and writing of logging data from a certain log file of storage system 120, manager system 110 can update column Z of log file table 4000 as shown in FIG. 4 to specify the last read location of the log file as well as a timestamp specifying a time of the read operation. Accordingly, manager system 110 examining data of columns Y and Z can determine that at any time during the deployment of system 100, whether most recently stored logging data written into storage system 120 by log agent 212 has been subject to processing by manager system 110 or is waiting to be processed.

Manager system 110 as indicated by block 1108 can be iteratively performing block 1106 to take actions specified by action decisions of decision data structure. Firing conditions for firing certain rows can be specified in log file table 4000 as described in FIG. 4, and manager system 110 can iteratively examine log file table 4000 to filter out certain log files as candidate files for processing. For example, manager system 110 according to some scenarios, can filter out a log file as a candidate file for processing if the log file within a threshold period time from the current time was subject to processing for log data reporting (e.g. sending of logging data or a log analysis report). Comparing timestamp data of row Y and row Z of log file table 4000 manager system 110 can determine whether there is any "stale" logging data in storage system 120 which has been stored in storage system 120 for more than a threshold period of time without responsive log data being sent to a tenant, either in the form of raw lawing data or report data. Accordingly, for iteratively performing block 1106 manager system 110 can be iteratively examining log file table 4000 e.g. for assessment of filing conditions, and/or for determining whether filtering conditions apply.

Embodiments herein recognize that logging data can be processed to generate report data that includes structured data that is of lighter weight, e.g. consumes less memory space and network bandwidth than raw logging data. Embodiments herein can include manager system 110 sending lightweight report data over a tenant network e.g. tenant network 180A in lieu of raw logging data.

Referring again the decision data structure 6000 of FIG. 6, the action decision of rows 2-4 of the decision data structure 6000 specifies the action decision of: generate analysis report and send report responsively to completion of logging. When the action decision of rows 2-4 is fired, manager system 110 can read the appropriate logging data from a specified log file within storage volume 120A and can subject the logging data to a specified analysis for generating of an analysis report of lighter weight than the original logging data. The action decision of rows 2-4 can specify that the generating of a report occur on completion of logging, i.e. on the completion of writing of logging data into a specified log file. On completion of reading of logging data from a specified log file, in accordance with the action decision of rows 2-4, manager system 110 can update column Z of log file table 4000 as shown in FIG. 4 so that column Z includes a location of a log file as subject to reading as well as a timestamp of the last reading. In such manner, column Z includes information as to a starting location for logging data during a next read operation of manager system 110.

Referring to the action decision of row 4, the action decision of row 4 can include the action specified in row 2 and row 3 and includes the additional action of sending sample logging data over tenant network 180A on completion of logging. The sample logging data sent in accordance with the action decision of row 4 can be of lower resolution and of lighter weight than full resolution logging data. The specified tenant for row 4 is tenant B rather than tenant A. As such, log data sent to a tenant over a tenant network when row 4 is fired will be sent over tenant network 180B rather than tenant network 180A.

The action decision associated with row 5 and 6 of the decision data structure 6000 specifies the action of sending log file data on request from tenant B. When the action decision of row 5 and 6 is fired, manager system 110 can refrain from taking action to perform any processing of a specified log file that is specified by the firing conditions unless and until a request for log file data is received from a tenant resource of one or more tenant resource 130B of tenant B according to the firing conditions of row 4 and row 5.

On receipt of a request for log file logging data in accordance with the action decision of row 5 and 6, manager system 110 for all specified log files specified by the firing conditions can examine column Z data to determine a file location of a last read operation and based on the file location of the last read operation can determine a starting point for a read operation according to the current action decision. The action decision of row 5 and row 6 is fired, manager system 110 can read log file logging data from one or more specified log file of storage system 120 and can write the log file logging data to a resource of one or more resource 130B by sending the log file logging data over tenant network 180B.

Embodiments herein recognize that the action specified by the action decision of row 5 and 6 can protect a tenant network provided by an IP network from negative consequences resulting from surges in logging data. By sending of logging data over a tenant network only at a specified time i.e. on an on demand basis when requested by a tenant enterprise, e.g. at a time determined by an administrator user of a tenant enterprise to be safe for transmission of logging data, logging data can be sent over a tenant network safely without negative impact on performance of a tenant network. Administrator user interface 3000 for display on an administrator client computer device of a tenant environment can include within area 3030 a feature to allow an administrator user of a tenant network to request delivery of log file logging data on demand according to the specified function of row 5 and row 6.

The analysis report that is generated can be differentiated in dependence on which action decision row is fired. For example, report R001 can be optimized for summarizing statistics specifying counts of various types of application events, and report R002 can be optimized to summarize top gateways associates to received message requests. An action decision can specify that more than one report be generated and sent.

The various action decisions can specify differentiated alarm profiles e.g. alarm profile A, alarm profile B, alarm profile C. For example, while system 100 can store logging data in storage system 120 without sending logging data in real time (without delay) to a resource of a tenant network, manager system 110 running logging data management process 111 can in real time be processing of logging data of storage system 120 for the detection of an alarm condition and manager system 110 can send an alarm notification message over tenant network 180A in real time in response to an alarm being detected. The alarm profiles as noted can differentiated. A first alarm condition can be optimized for detection of a denial of service (DOS) attack a second alarm can be optimized for detection of an increased loading alarm condition (over-utilization of allocated resources) and a third alarm can be optimized for detection of a decreased loading alarm condition (under-utilization of allocated resources). An action decision can specify alternatively that multiple alarm profiles can be simultaneously active according to one embodiment.

There is set forth herein according to one embodiment, (A) a computer implemented method comprising: receiving, by a log agent of computing node stack, logging data generated by at least one application log data collection agent, the log agent being defined within a system software layer of the computing node stack, wherein the at least one application log data collection agent generates application logging data of a tenant application associated to a first tenant, wherein the tenant application receives client request messages from respective clients over an IP based tenant network of the first tenant, and sends response messages to the respective clients over the IP based tenant network; and sending, by the log agent, the logging data to physical storage system over a storage area network (SAN), wherein the physical storage system includes one or more physical storage device. There is also presented the computer implemented method of (A), wherein the tenant application runs on a guest operating system (OS) that defines a virtual machine (VM) and wherein the log agent is defined within a hypervisor that presents a virtual operating platform to the guest OS. There is also presented the computer implemented method of (A), wherein the tenant application runs within a container that defines a virtual machine (VM) and wherein the log agent is defined within an OS that runs on a computing node of the computing node stack. There is also presented the computer implemented method of (A), wherein the at least one log data collection agent includes a first log collection agent that collects logging data of a first application of the first tenant, and a second log collection agent that collects logging data of a second application of a second application, the second application being hosted within the computing node stack so that the logging data includes first logging data of the first tenant and second logging data of the second tenant, wherein the physical storage system defines a storage volume associated to the computing node tenant, wherein the storage volume stores the first logging data of the first tenant within a first folder of the storage volume and the second logging data of the second tenant within a second folder of the storage volume. There is also presented the computer implemented method of (A), wherein the at least one log data collection agent includes a first log collection agent that collects logging data of a first application of the first tenant, and a second log collection agent that collects logging data of a second application of a second application, the second application being hosted within the computing node stack so that the logging data includes first logging data of the first tenant and second logging data of the second tenant, wherein the physical storage system defines a storage volume associated to the computing node tenant, wherein the storage volume stores the first logging data of the first tenant within a first folder of the storage volume and the second logging data of the second tenant within a second folder of the storage volume, wherein the physical storage system is provided by a single hard disk. There is also presented the computer implemented method of (A), wherein the SAN defines a fibre channel network. There is also presented the computer implemented method of (A), wherein the sending, by the log agent, the logging data to the physical storage system includes sending the logging data using the fibre channel (FC) transfer protocol, and for transport, the fibre channel protocol (FCP) over FC. There is also presented the computer implemented method of (A), wherein the computing node stack runs an application of a second tenant so that the computing node stack defines a multitenancy shared computing environment, and wherein the computing node stack includes a log plugin that reads logging data from the at least one application log collection agent and writes the logging data to an open socket of the hypervisor. There is also presented the computer implemented method of (A), wherein the computing node stack includes a log plugin that reads logging data from the at least one application log collection agent and writes the logging data to an open socket of the hypervisor, and wherein the log agent reads the logging data from the open socket. There is also presented the computer implemented method of (A), wherein the log agent in response to a virtual machine for a second tenant being installed in the computing node stack, creates a certain folder within the physical storage system for storing logging data of the second tenant, and wherein the log agent writes logging data of the second tenant to the certain folder. There is also presented the computer implemented method of (A), wherein a multitenancy shared computing environment having the computing node stack includes a management system in communication with the physical storage system, wherein the management system examines data of a log table that associates folders tenants and files to folder, to determine a certain folder identifier and file identifier within the physical storage system associated to the tenant, queries the data of the logging data from the physical storage system using the folder identifier and the file identifier, analyzes returned data of the logging data to generate a logging data analysis report and sends the report to a resource of the tenant over the IP based tenant network. There is also presented the computer implemented method of (A), wherein a shared computing environment having the computing node stack includes a management system in communication with the physical storage system, wherein the management system examines data of a log table that associates folders tenants and files to folder, to determine a certain folder identifier and file identifier within the physical storage system associated to the tenant, queries the data of the logging data from the physical storage system using the folder identifier and the file identifier, monitors data traffic of the IP based tenant network associated to the tenant, and sends returned data of the logging data to a resource of the tenant over the IP based tenant network based on an intensity of data traffic falling below a threshold intensity. There is also presented the computer implemented method of (A), wherein the physical storage system includes first and second volumes, wherein the first volume is associated to a computing node stack, wherein the second volume is associated to a second computing node stack of a multitenancy shared computing environment having the computing node stack, wherein the second computing node stack includes a respective second hypervisor, wherein the first volume and the second volume are identifiable by a logical interface the hypervisor and the second hypervisor. There is also presented the computer implemented method of (A), wherein the physical storage system includes first and second volumes, wherein the first volume is associated to a computing node stack, wherein the second volume is associated to a second computing node stack of a multitenancy shared computing environment having the computing node stack, wherein the second computing node stack includes a respective second hypervisor, wherein the first volume and the second volume are identifiable by the hypervisor and the second hypervisor, wherein the first volume includes a first folder, and a second folder, wherein the first folder stores logging data of the tenant, and wherein the second folder stores logging data of a second tenant having a second application running within the computing node stack, wherein the tenant application runs on a guest operating system (OS) that defines a virtual machine (VM) and wherein the log agent is defined within a hypervisor that presents a virtual operating platform to the guest OS, wherein the second tenant application runs on a second guest operating system (OS) that defines a second virtual machine (VM). There is also presented the computer implemented method of (A), wherein the at least one log data collection agent includes a first log collection agent that collects logging data of a first application of the first tenant, and a second log collection agent that collects logging data of a second application of a second application, the second application being hosted within the computing node stack so that the logging data includes first logging data of the first tenant and second logging data of the second tenant, wherein the physical storage system defines a storage volume associated to the computing node tenant, wherein the storage volume stores the first logging data of the first tenant within a first folder of the storage volume and the second logging data of the second tenant within a second folder of the storage volume, wherein the method includes examining by a manager system of action specifying configuration data defined by respective administrator users of the first tenant and the second tenant, and wherein the manager system in dependence on the examining, reads the first logging data from the first folder, performs a first action using the first logging data and sends first data over the first IP based tenant network in dependence on the first action, reads the second logging data from the second folder and performs a second action using the second logging data. There is also presented a computer implemented method wherein the first action is an action specified in the action specifying configuration data by a first tenant administrator user of the first tenant, and wherein the second action is an action specified in the action specifying configuration data by a second tenant administrator user of the second tenant, wherein the first action is differentiated from the second action, and wherein each of the first action and the second action includes one or more of the following selected from the group consisting of (a) analysis of logging data to return a logging data report and sending report data over the IP based tenant network; (b) sending logging data over the IP based tenant network in response to monitoring of data traffic; (c) sending sample logging data over the IP based tenant network of lower resolution than raw lagging data, and (d) sending logging data over the IP based tenant network responsively to a tenant request.

There is set forth herein (B) a computer program product comprising:

a computer readable storage medium readable by one or more processing circuit and storing instructions for execution by one or more processor for performing a method comprising: receiving, by a log agent of computing node stack logging data generated by at least one application log data collection agent, the log agent being defined within a system software layer of the computing node stack, wherein the at least one application log data collection agent generates application logging data of a tenant application associated to a first tenant, wherein the tenant application receives client request messages from respective clients over an IP based tenant network of the first tenant, and sends response messages to the respective clients over the IP based tenant network; and sending, by the log agent, the logging data to physical storage system over a storage area network (SAN), wherein the physical storage system includes one or more physical storage device.

There is also set forth herein (C) a system comprising: a first computing node stack having a first computing node provided by a first physical computing node, a first log agent being defined within a system software layer of the first computing node stack, wherein a first log data collection agent of the first computing node stack generates first logging data of a first tenant application of a first tenant, wherein the first tenant application receives client request messages from respective clients over an IP based first tenant network, and sends response messages to the respective clients over the IP based first tenant network, wherein a second log data collection agent of the first computing node stack generates second logging data of a second tenant application of a second tenant, wherein the second tenant application receives client request messages from respective clients over an IP based second tenant network, and sends response messages to the respective clients over the IP based second tenant network; a second computing node stack having a second computing node provided by a second physical computing node, a second log agent being defined within a system software layer of the second computing node stack, wherein a first log data collection agent of the second computing node stack generates third logging data of a second tenant application of the first tenant, wherein the second tenant application receives client request messages from respective clients over an IP based first tenant network, and sends response messages to the respective clients over the IP based first tenant network; and sending, by the first log agent, the first logging data to physical storage system over a storage area network (SAN), wherein the physical storage system includes one or more physical storage device; sending, by the first log agent, the second logging data to the physical storage system over the storage area network (SAN); sending, by the second log agent, the third logging data to physical storage system over the storage area network (SAN). There is also set forth herein the system of (C), wherein the physical storage system is organized into first and second volumes that are identifiable by respective logical interfaces of system layer software of the first computing node stack and the second computing node stack, wherein the first volume has a first folder for storing the first logging data of the first tenant and a second folder for storing the second logging data of the first tenant, wherein the second volume has a third folder for storing the third logging data of the first tenant. There is also set forth herein the system of (C), wherein the physical storage system is organized into first and second volumes that are identifiable by respective logical interfaces of system layer software of the first computing node stack and the second computing node stack, wherein the first volume has a first folder for storing the first logging data of the first tenant and a second folder for storing the second logging data of the first tenant, wherein the second volume has a third folder for storing the third logging data of the first tenant, wherein the system includes a manager system that performs examining of action specifying configuration data defined by respective administrator users of the first tenant and the second tenant, and wherein the manager system in dependence on the examining, reads the first logging data from the first folder performs a first action using the first logging data and sends first data over the first IP based tenant network in dependence on the first action, reads the second logging data from the second folder performs a second action using the second logging data and sends second data over the second IP based tenant network in dependence on the second action, reads the third logging data from the third folder performs a third action using the third logging data and sends third data over the first IP based tenant network in dependence on the third action.

Embodiments herein recognize that with current logging processes logging data defined by log messages can be transmitted through the same data network (e.g. an IP based tenant network) with workload data traffic (e.g. comprised of client messaging data traffic and tenant resource data traffic). During peak load time, the logging process may be unstable or unavailable. Further there is an inherit security issue since the logging process has to expose a service endpoint for a log collector agent to send log data. If a service is hacked, this service endpoint may be used to inject malicious data or even lead to a DOS attack. In addition a currently available logging process can impose restrictions on a logging data format.

Embodiment herein can include a multi-component distributed logging process. A multi tier shared volume physical storage system can be used to store the logging data. According to one embodiment, logging data can be sent to a physical storage system via a storage path. According to one embodiment a storage path can be provided by a Storage Area Network (SAN). Logging data generated by log collector agents can be written to a folder on a shared volume physical storage system via a Log agent.

A domain agent defined by manager system 110 can maintain a mapping table to record the mapping between volume, folder, file and tenants. Based on the mapping table, a log analysis unit defined by manager system 110 can mount the shared volume defined within storage system 120 in read-only mode to read the logging data for any specified tenant. Since logging data is stored in files, logging analysis can be perform without risk of losing logging data during logging data processing as in a currently available logging process. There is set forth herein according to one embodiment storing, under control of the distributed logging system and via a storage path, the logging data as a plurality of files stored in a multi tier, shared volume storage system, with the storage of the logging data as a plurality of files including: dividing the plurality of files among and between a plurality of shared volume data structures, and organizing each shared volume data structure of the plurality of shared volume data structures according to a plurality of tiers; for each given file of the plurality of files; mapping, by a domain agent and in a mapping table data structure, an association between the given file and the shared volume data structure in which the given file is stored, and mapping, by the domain agent and in the mapping table data structure, an association between the given file and a file path through the tiers to identify a location where given file is stored; mounting, by a log analysis unit, in read only mode a first shared volume data structure of the plurality of shared volume data structures; and subsequent to the mounting, reading the logging data for a specified tenant of the plurality of tenants from the first shared volume data structure based upon the mappings of the mapping table.

A storage system 120 configured as multi tier shared volume physical storage volume can be provided as part of system 100. According to one embodiment, each computing node 10 can have a unique volume of storage system 120 mounted thereto.

Logging data from any log collector agent associated to a VM (hypervisor based or container based) on a certain host computing node 10 can be redirected to a file on the volume via a log agent on the computing node. A log plugin within a tenant resource (e.g. hypervisor based VM or container based VM) can receive logging data from log collector agent and redirect it to a log agent. Various processes can be used for communication of logging data from a log plugin to log agent can communicate with each other. For example, where a virtualized architecture is employed a log plugin can talk to log agent via virt-serial, virt-socket, or virt-filesystem.

A log agent on a host computing node can be responsible for redirecting logging data to a file within a particular folder on a mounted volume of storage system 120. A log agent can also be responsible for communicating with a domain agent defined by manager system 110 about the mapping between log file, folder, volume and tenant. A log agent associated to a computing node 10 can also regulate the flow of the logging based on certain pre-defined policies. For example once usage of a volume of storage system 120 reaches a certain threshold, a log agent of a computing node 10 provided by certain computing node can communicate with a domain agent defined by manager system 110 to allocate additional volume so that the additional volume is mounted to the certain computing node.

A domain agent defined by manager system 110 can maintain a mapping table to keep track of associations between tenant, file, folder, volume and other parameters so that the domain agent can easily tell the whole picture of the logging data for any particular tenant. A domain agent defined by manager system 110 can also record pre-defined logging polices, and can communicate with the underlying cloud infrastructure to ask for additional storage volumes. A domain agent defined by manager system 110 does not interact with the logging volumes directly.

A log analysis unit of manager system 110 can be responsible for processing of logging data processing for a particular tenant. The log analysis unit of manager system 110 can mount a volume in read-only mode according to the mapping information in a domain agent and read actual logging data stored in storage system 120 for processing.

There is set forth herein according to one embodiment a multi tier shared volume based centralized logging system.

According to one embodiment, a centralized logging process featuring a physical storage system is a core component of distributed system. Centralized logging can greatly help an administrator user to find the root cause when issues happen. Centralized logging can include e.g. collection, transport, storage, and analysis.

Figure 7:
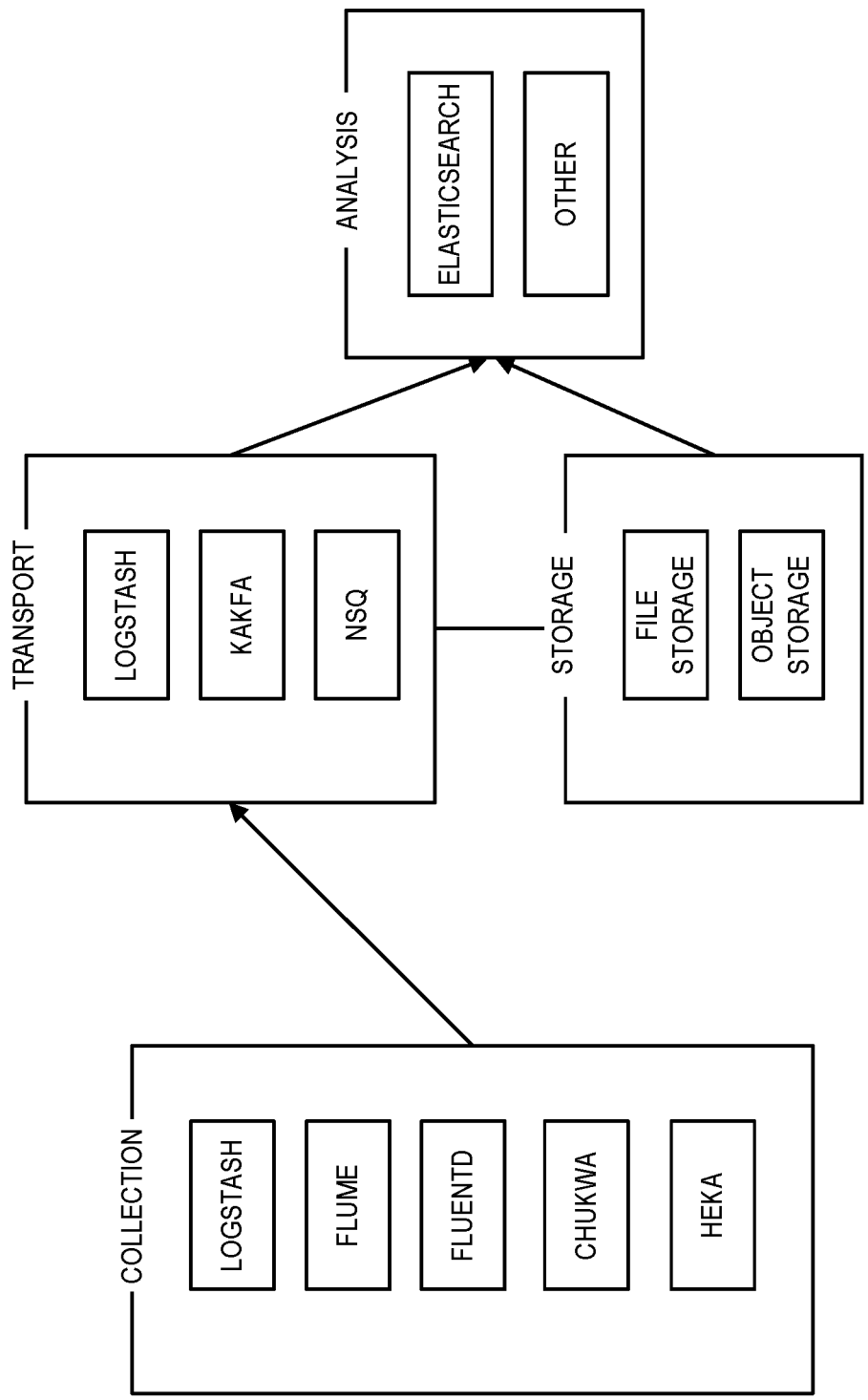
FIG. 7 illustrates a component diagram for implementation of a logging process according to one embodiment.

As depicted in FIG. 7 a log message defining logging data can be sent several times between different systems such as between a collection system, a transport system, a storage system and an analysis system.

When a customer system load is high, client messaging data traffic can increase and logging data bursts can occur at the same time. Logging data traffic can impact the client messaging data traffic, and in some scenarios can cause a hosted service provided to a customer to be rendered unavailable.

Some logging data defined by log messages can be lost in the described scenarios. Accordingly, logging data analysis can be impacted.

In some scenarios, some of customer is abnormal situation, it will continues send logs to transport component, it will cause a DOS attack to the transport node.

According to some currently available logging processes, a tenant enterprise may be charged separately based on data traffic through a tenant IP based network and for logging services. As logging data can increase an amount of data traffic through a tenant network, a tenant enterprise in effect can pay twice for logging data services.

Embodiments herein provide a multi tier shared volume based centralized logging system that can features a shared volume physical storage system.

Embodiments herein can feature various advantages. System 100 can be configured so that logging data defined by log messages will not impact client messaging data traffic.

System 100 can be configured so that there is no logging data defined by log messages lost. System 100 can provide a smaller granularity security check. System 100 can be configured so that the described double pay issue can be avoided.

Embodiments herein can provide logging data process. Embodiments herein can feature a centralized physical storage system to replace a current available process wherein logging data is sent over a tenant IP based network to a tenant resource.

Embodiments herein can provide a multi tier shared volume log collection system. A first tier can map each volume of a physical storage system to a hypervisor running on a computing node 10 provided by a physical computing node. The second tier can map a folder under each volume to a tenant resource (e.g. hypervisor based VM or container based VM). The third tier can map tenant log files within a folder of a volume.

Embodiments herein can provide a log agent inside each hypervisor which will receive tenant logging data from a log plugin. The log agent can in turn write the logging data into a tenant log file. A log agent can also provide flow control for security.

Embodiments herein can provide a synchronization mechanism to read logs file into a log analysis system defined by manager system 110. A log agent associated to a computing node can split logs into small logs file, it can send the old log filename to a domain agent defined by manager system 110. The domain agent defined by manager system 110 can then read the log file. There is no read/write confliction.

Embodiments herein can provide a multi tier shared volume log collection system. According to a one embodiment a first tier can divide a physical storage system into multiple volumes, and each respective volume can mount to only one hypervisor, but multiple volumes can be mounted to same hypervisor, e.g. a hypervisor may scale up its associated volumes as logging data increases.

There can be two cases to create a new volume: (a) a new hypervisor bootup; (b) logging data associated to a hypervisor may require more storage space.

According to a second tier, a log agent will create a folder for that tenant system on bootup of each new tenant system. According to a third tier, each tenant can have multiple logs file. Each tenant can be mapped to multiple logs file in a folder associated to a tenant.

A logging process can include the following: (1) Step 1: When a tenant enterprise subscribes to a logging data service, a tenant system can install some log collection agent and a log plugin as set forth herein. Various tools can be employed for log collection.

The log plugin can leverage the virtio character device of the tenant system. When a log collection agent forwards logging data defined by a log message, the log collection agent can send a log message with a log filename to the character device.

A logging process can also include (2) Step 2: Embodiments herein can provide a virtio character device backend. A log plugin herein can read logging data generated by a log collection agent of a tenant system and write the logging data into a UNIX socket. A log agent inside a hypervisor can listen on all UNIX sockets of a hypervisor, and can read the logging data defined by a log message and filename.

A logging process can also include (3) Step 3: A log agent can determine a proper log file and choose proper log file and can write logging data defined by log messages into the log file.

For each tenant, a domain agent defined by manager system 110 can select a proper log analysis unit to service a particular tenant. When there is a new tenant log file created, the log agent can send the filename to a domain agent defined by manager system 110 and the domain agent can forward the new file name to a log analysis unit of the manager system 110. The log analysis unit can mount the volume as read only.

Embodiments herein can include an agent inside the log analysis unit. This agent can record the last position where a log analysis unit read the log file, then poll the change of the file. Once the file changes, it will read from a position of a log file based on the recorded last read position. The logging data read from the log file can be input into the log analysis system.

There is set forth herein a multi tier shared volume based centralized logging system.

Centralized logging system is core component of distributed system, it can greatly help the administrator to find the root cause when issues happen. It includes 4 aspects: collection, transport, storage, and analysis.

Referring to FIG. 7, a log message can be sent several times between different systems. It will cause many negative sequences:

When customer system load is high, customer network traffic will be very high and logs burst can ccur at the same time. Log traffic will greatly impact the customer normal traffic, it will cause customer service un-available. Some logs message will also be lost at above scenarios, it will impact the customer log analysis.

In some scenarios, some of customer is abnormal situation, it will continues send logs to transport component, it will cause a DOS attack to the transport node. In the public cloud, there is another dilemma: customers will pay for their log service, and they also must pay the network traffic of the log message. It means the customer double pay for the log service.

There is set forth herein a multi tier shared volume based centralized logging system. The system described herein replaces normal network with storage network. It has following advantages: (a) log message will not impact customer normal traffic; (b) there is no log message lost; (c) a smaller granularity security check is provided; and (d) there is no double pay issue.

Figure 8:
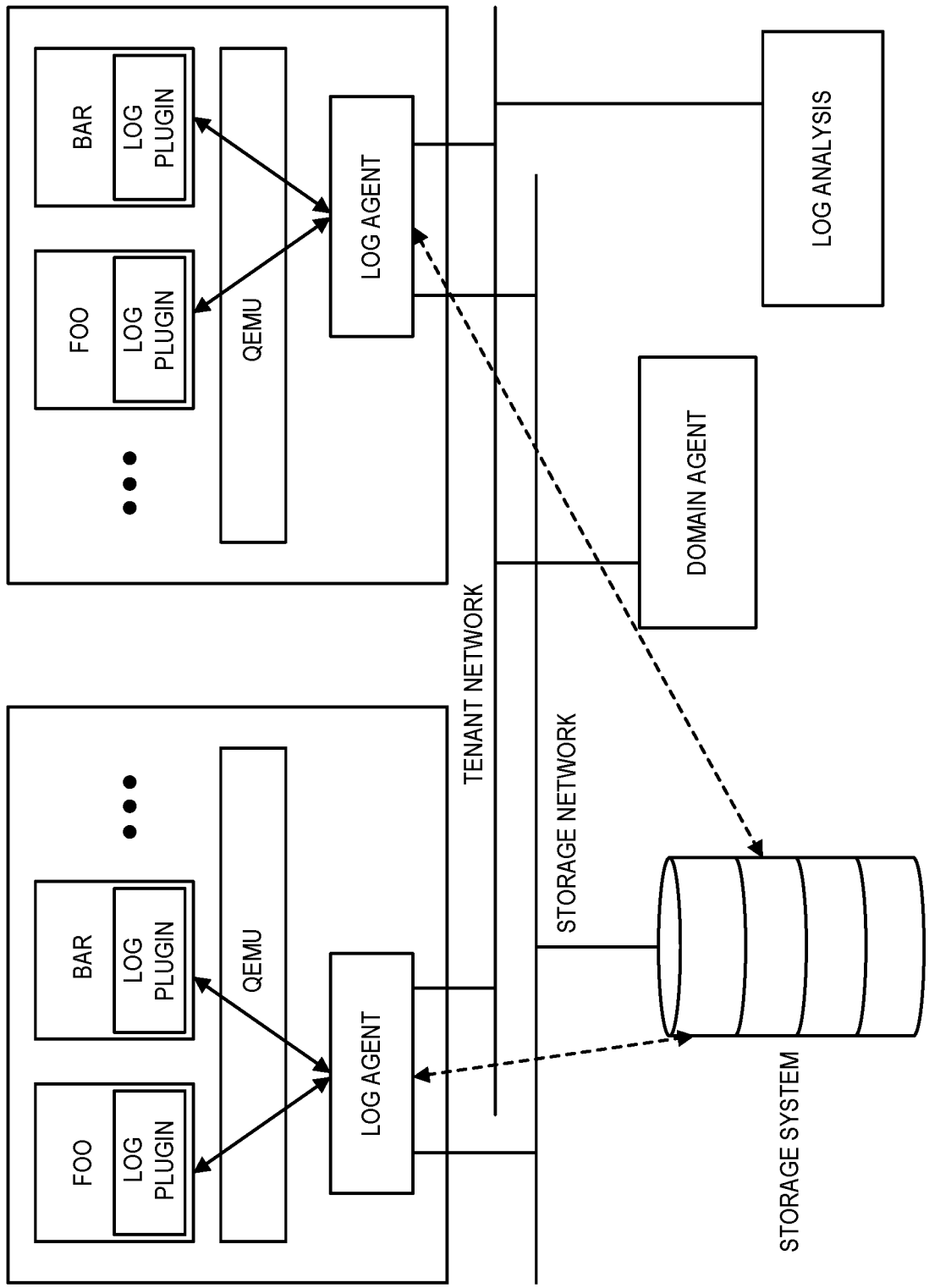
FIG. 8 is a block diagram depicting a distributed logging system according to one embodiment.

The system set forth herein provides a solution for cloud log collection system. It uses a storage system to replace a current network based log system. A system schematic diagram is set forth in FIG. 8.

There is set forth herein according to one embodiment a multi tier share volume log collection system. The first tier can map each volume of storage to a hypervisor. The second tier can map a folder under each volume to a tenant system (VM or container). The third tier can include tenant log files in their folder.

There is set forth herein according to one embodiment a log agent inside each hypervisor which will receive tenant log from Log Plugin, then it will write the log into tenant log file. It also provides the flow control for security.

A log agent can provide a synchronization mechanism to read logs file into a log analysis system. A log agent can split logs into small logs file. A log agent can send the old log file name to domain agent, and a domain agent can then then read the log file. There is no read/write confliction.

There is set forth herein a multi tier share volume log collection system. A first tier (1) can split the storage system into multiple volumes, wherein each volume will be mount to only 1 hypervisor, but multiple volumes can be mount to same hypervisor to facilitate the hypervisor scaling up its log volume size.

There are multiple cases to create a new volume: (a) a new hypervisor bootup, and (b) a hypervisor is determined to require additional storage space.

According to a second tier (2), on each tenant system bootup, the log agent can create a folder for that tenant system.

Figure 9:
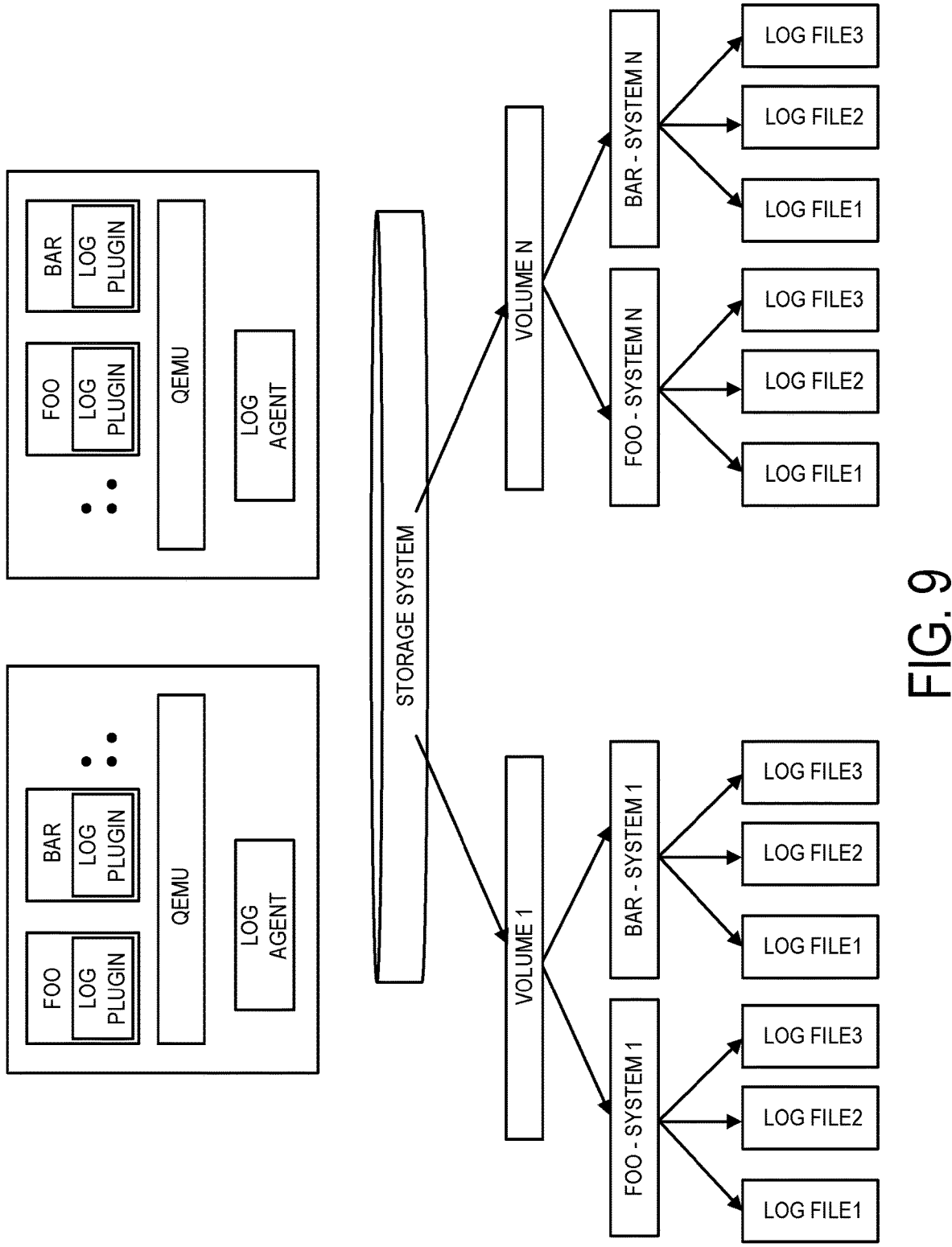
FIG. 9 is a block diagram depicting a distributed logging system according to one embodiment.

According to a third tier (3), each tenant may have multiple log files. Each will be mapped to multiple logs file in the folder. FIG. 9 shows the whole structure of the log collection system. There is set forth herein according to one embodiment storing, under control of the distributed logging system and via a storage path, the logging data as a plurality of files stored in a multi tier, shared volume storage system, with the storage of the logging data as a plurality of files including: dividing the plurality of files among and between a plurality of shared volume data structures, and organizing each shared volume data structure of the plurality of shared volume data structures according to a plurality of tiers; for each given file of the plurality of files; mapping, by a domain agent and in a mapping table data structure, an association between the given file and the shared volume data structure in which the given file is stored, and mapping, by the domain agent and in the mapping table data structure, an association between the given file and a file path through the tiers to identify a location where given file is stored; mounting, by a log analysis unit, in read only mode a first shared volume data structure of the plurality of shared volume data structures; and subsequent to the mounting, reading the logging data for a specified tenant of the plurality of tenants from the first shared volume data structure based upon the mappings of the mapping table.

The following will describe the log collection procedure in which (A) a tenant stores a log message and in which (B) a log system can read log files.

Figure 10:
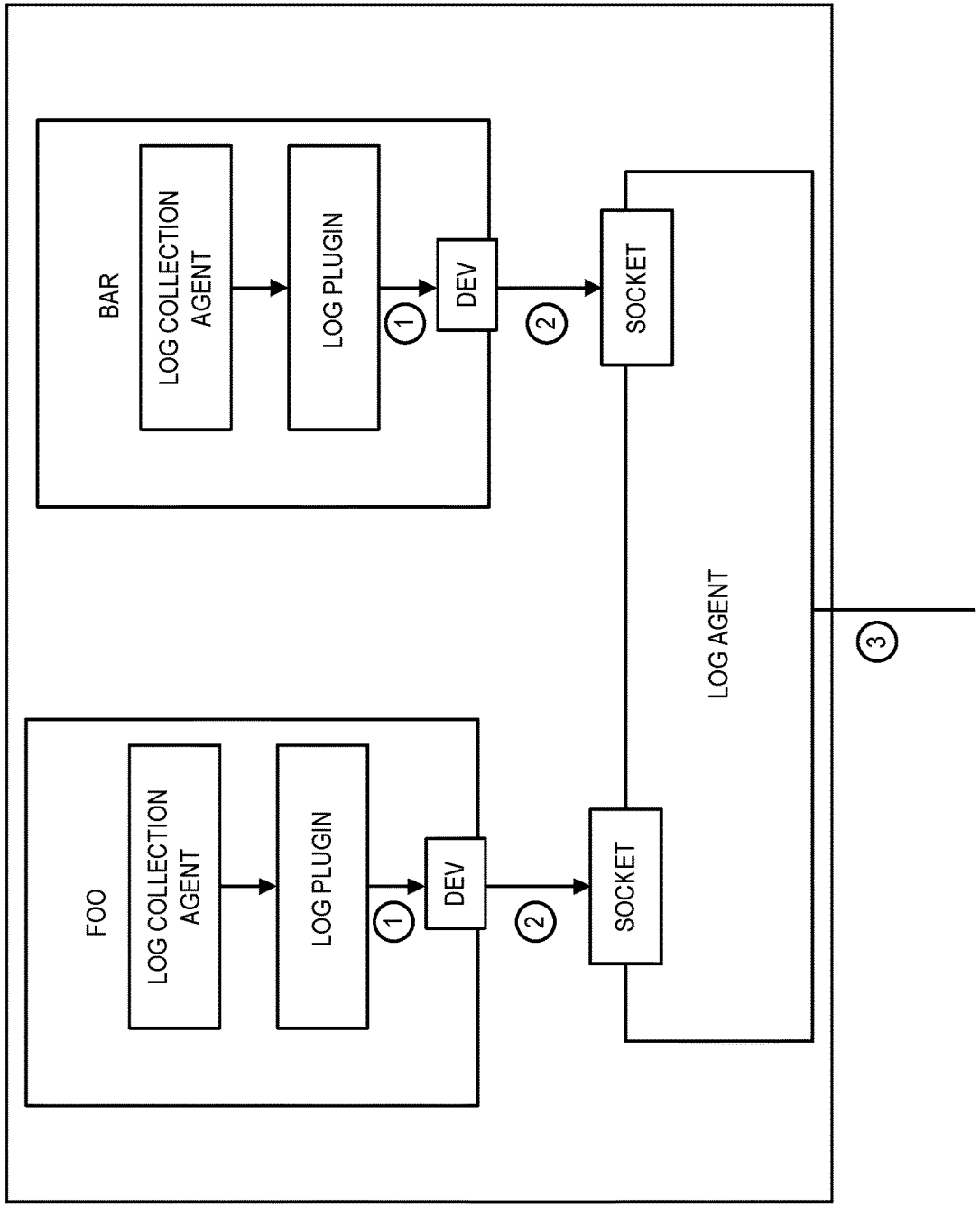
FIG. 10 is a block diagram depicting a distributed logging system according to one embodiment.

(A) A tenant stores a log message. A tenant storing a log message can be broken down into Step 1, Step 2, and Step 3 hereinbelow. FIG. 10 illustrates an architecture for facilitating tenant storage of a log message.

Step 1: When a tenant subscribes to the log service, a tenant system can install some log collection agent like Filebeat™ (Filebeat™ is available from Elastic NV of Amsterdam, the Netherlands) or Flume™ (Flume™ is available from the Apache Software Foundation®). When a tenant subscribes to a log service it can also install a new plugin as set forth herein.

The plugin can leverage the virtio character device of the tenant system. When a log collection agent forwards a log message, it will send a log message and log file name to the character device.

Step 2: This disclosure will provide a virtio character device backend, it will read the log from tenant system and write into a UNIX socket. As depicted in FIG. 10 a log agent inside hypervisor can listen on all the UNIX sockets, and read the message and filename.

Step 3: The log agent can choose a proper log file and write messages into the log file.

(B) The Log System reads log files.

Figure 11:
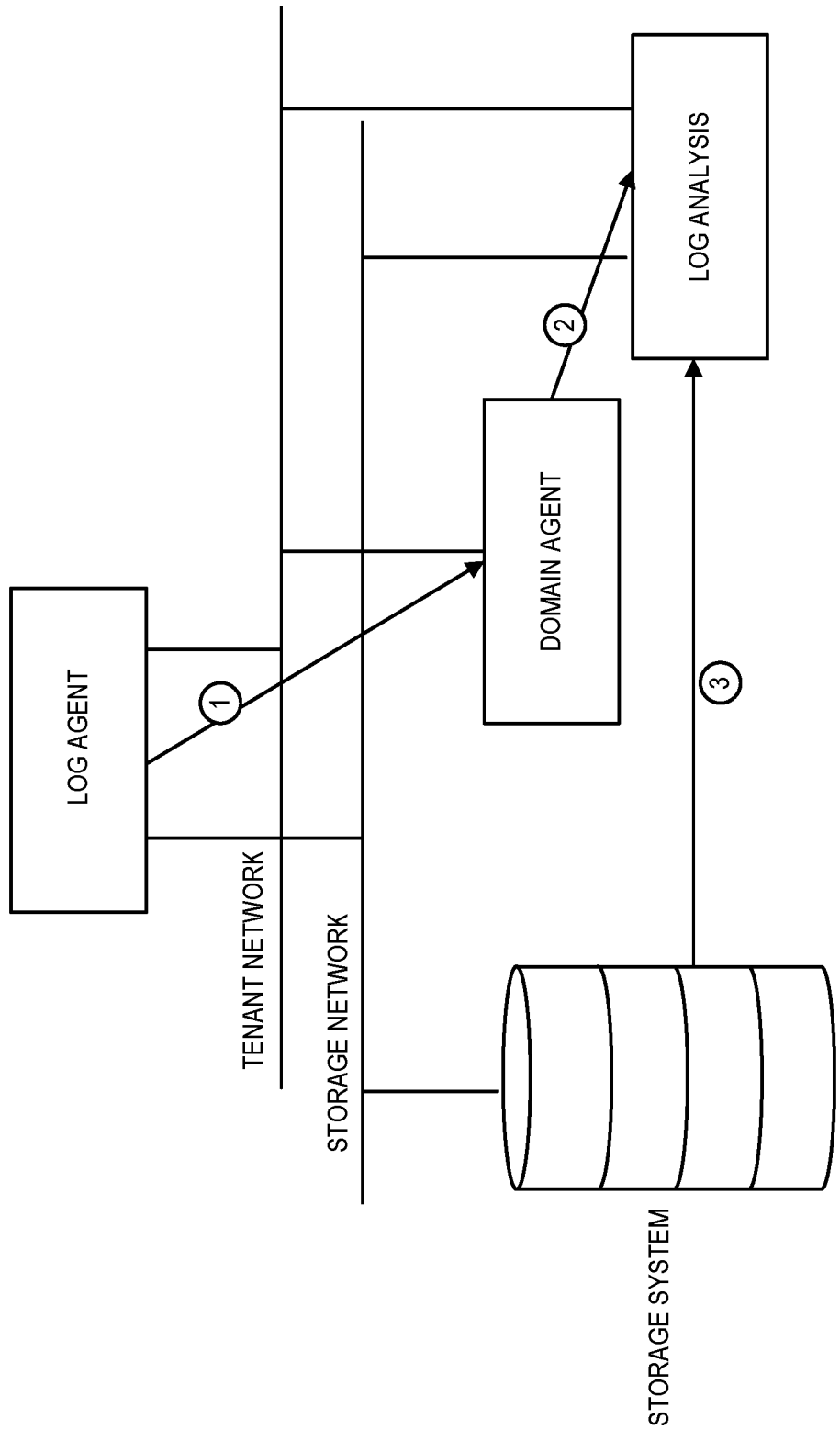
FIG. 11 is a block diagram depicting a distributed logging system according to one embodiment.

For each tenant, a domain agent can choose a proper log analysis unit to service this tenant. FIG. 11 depicts an architecture featuring a domain agent in communication with a log analysis unit and a log agent wherein the log analysis unit is in communication with a storage system. When there is a new tenant log file created, a log agent (1) will send the file name to domain agent, a domain agent (2) will forward to log analysis unit, and log analysis unit (3) will mount the volume as read-only. The domain agent and log analysis unit define a manager system as set forth herein described in one embodiment in connection with manager system 110 of FIG. 1A.

Figure 12:
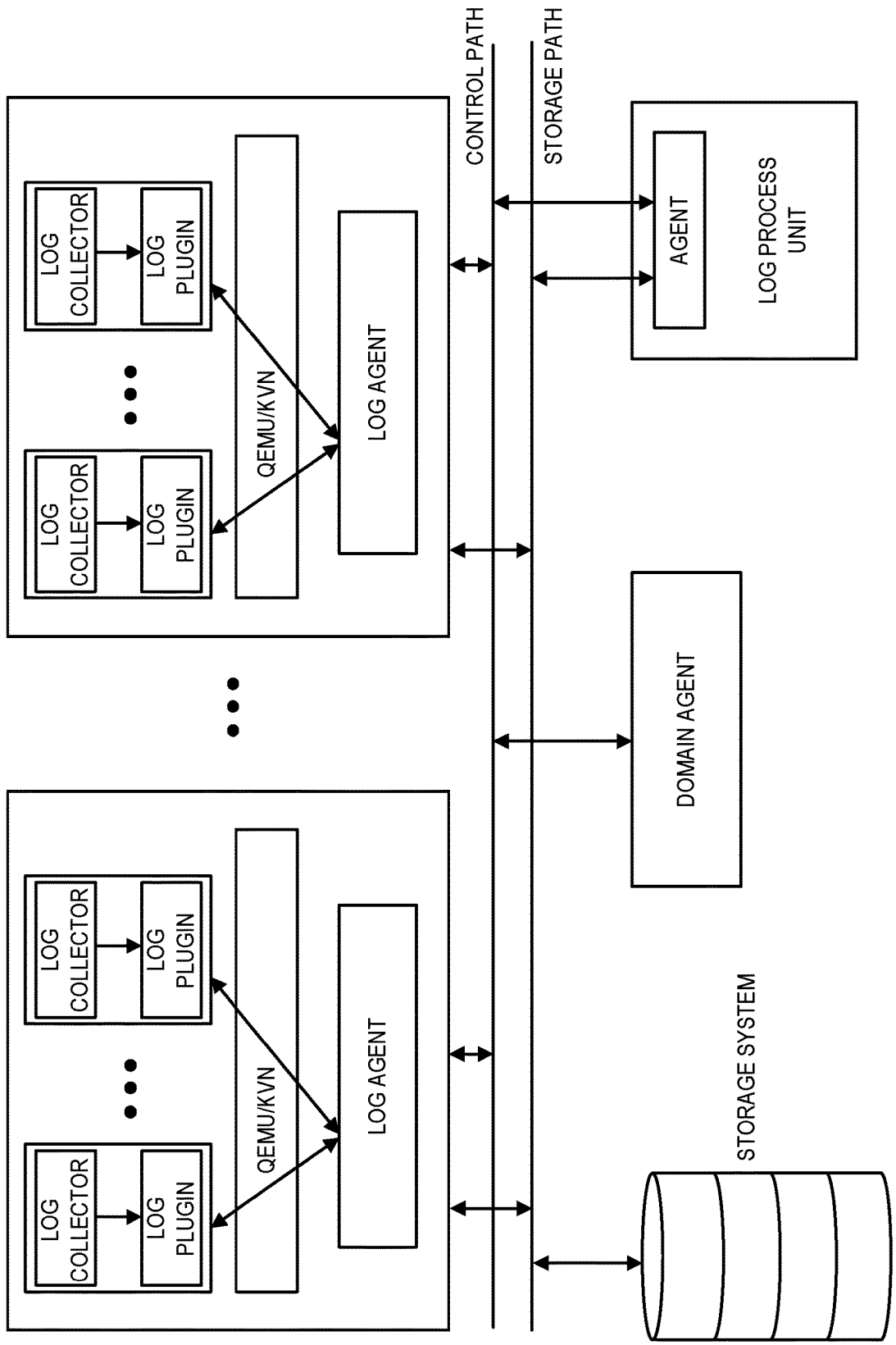
FIG. 12 is a block diagram depicting a distributed logging system according to one embodiment.

There is set forth herein according to one embodiment, an agent inside the log analysis unit as depicted in FIG. 12. This agent will record the last position where it read the file, then poll the change of the file. Once the file changes, it will read from some position. Then input into the Log Analysis system.

In traditional logging systems, there are a few issues with the design. For example, the logging data is transmitted through the same data network with the workload. During peak load time, the logging service may be unstable or unavailable. Further there is a inherit security issue since the logging service has to expose a service endpoint for the log collector to send log data. If the system is hacked, this service endpoint may be used to inject data or even lead to DOS attack. Further, a traditional logging system imposes a restriction of logging data format.

There is set forth herein a distributed logging system design. In this design, a multi tier shared volume storage system is used to store the logging data. Specifically, the logging data can be transferred via the storage path. Logs from log collectors can first be written to a folder on a shared volume via a log agent. A domain agent can maintain a mapping table e.g. according to log file table 4000 as shown in FIG. 4 to record the mapping between volume, folder, file and tenants. Based on this mapping table, the log analysis unit can mount the shared-volume in read-only mode to read the logging data for any specified tenant. And since the logging data is stored in files, logging analysis can be performed without losing data during log data processing as in a prior art design.

There is set forth herein a multi tier shared-volume storage mechanism. In this design, each compute host (e.g. defined by computing node 10 in the multitenancy shared computing environment 150 of FIG. 1A) has a unique volume mounted. Logging data from any log collector in a VM/container on this compute host will be redirected to a file on the volume via a Log agent on the compute host.

A log plugin within a tenant resource (VM/container) can receive logging data from a log collector and redirect it to a log agent. There are many ways the log plugin and Log agent can communicate with each other. For example, a log plugin can talk to log agent via virt-serial, virt-socket, or virt-filesystem mechanisms when virtualization is used.

The log agent on the compute host can be responsible for redirecting logging data to a file within a particular folder on the mounted volume. It can also be responsible for communicating with the domain agent about the mapping between log file, folder, volume and tenant. The log agent can also regulate the flow of the data logging based on certain pre-defined policies. And once the volume usage reaches a certain threshold, the log agent can communicate with domain agent to allocate additional volume and to mount to this compute host.

The domain agent can maintain a central mapping table e.g. according to log file table 4000 as shown in FIG. 4 to keep track of the correlations of tenant, file, folder, volume etc. Accordingly the domain agent can easily access comprehensive logging data for any particular tenant. A domain agent can also record the pre-defined logging polices, and communicate with the underlying cloud infrastructure to ask for additional storage volumes. The domain agent according to one embodiment does not interact with the logging volumes directly.

The log analysis unit is responsible for log processing for a particular tenant. This log analysis unit can mount a volume in read-only mode according to the mapping information in a domain agent and read actual log data.

There is set forth herein a method to collect, store and retrieve logging data in a multi-tenancy cloud environment. There is set forth herein a storage system that can include a storage server (such as a SAN storage server or iSCSI storage server) that can use a volume provisioned by the central storage server for each physical compute node. There is set forth herein a method to allow multiple tenants to write logging data to different folders within same shared volume with the coordination of a log agent. The method in one embodiment can rely on a dedicated storage network to separate the logging traffic from normal tenant traffic.

There is set forth herein storage system having tiers and a logging system having tiers. Tiers of a logging system can include (i) a log collection agent tier that generates logging data, (ii) a log plugin tier that received logging data from a log collection agent and forwards logging data to a log agent; (iii) a log agent tier that received logging data from a log plugin and stores the logging data into the storage system; (iv) a domain agent that maintains mapping table as set forth herein, and (v) a log analysis unit that analysis file stored logging data of a storage system.

In a logging system set forth herein, logging data can be stored on different volumes of a storage server, such as SAN or iSCSI storage server. There is set forth herein a multi tier shared volume log collection system for access by multiple tenants. There is set forth herein a dedicated storage server to transfer logs. When a tenant subscribes to the log service, the tenant system can install a log collection agent like Filebeat™ or Flume™, and a new log plugin (may be pre-embedded as part of the system image). With the described architecture a log message will not impact customer normal data traffic since the log message is transmitted into a storage path.

There is set forth herein a log agent inside each compute node which will receive tenant log from a log plugin, then it will write the log into tenant log file on a storage volume. Accordingly, data loss can be avoided even when a compute node fails.

There is set forth herein a method of addressing problems of logging data collection, store and retrieval in a multi-tenancy cloud environment. There is set forth herein a multi-tier logging system including: (i) log collection agent; (ii) Log Plugin; (iii) Log Agent; (iv) Domain Agent and (v) log analysis unit. There is set forth herein use of shared volumes provisioned by storage server to store the physical logging data. There is set forth herein a method to address logging data collecting and storing and retrieval for a multi-tenancy cloud environment. The logging data can be generated by a generic application/service.

There is set forth herein a mechanism to mechanism to collect a user log in a multi-tenancy environment especially in a cloud environment. The method addresses log traffic control, log security and missing log data drawbacks of a current cloud logging system.

There is set forth herein, a method that includes deploying in a hosted service computing system, a log agent instantiation such that a log agent is running in the system software layer of the computing node stack representation of the hosted service computing system; deploying in the hosted service computing system, a log data collection agent instantiation; deploying, in the hosted service computing system a first instantiation of a first application, with the first instantiation of the first application being reserved for the use of a first tenant (e.g. tenant Foo indicated in FIGS. 8-10, and FIG. 12) of a plurality of tenants of the hosted service computing system; receiving, by the log agent instantiation and from the log data collection agent instantiation, first application logging data that is generated by operations of the first instantiation of the first application and collected by the log data collection agent instantiation; and storing, by the log agent, the first application logging data in a storage area network (SAN) type storage system.

Certain embodiments herein can provide technical computing advantages involving computing advantages arising the realm of computer networks. Embodiments herein can include features for separation of logging data from workload data traffic so that while client messaging data traffic is sent over a tenant network, logging data is sent to a storage system over a storage area network (SAN). A separation of logging data traffic from client messaging data traffic can protect a tenant network so that a tenant network is not impacted by bursts in logging data. Further, the separation of logging data from client messaging data traffic can alleviate disruptions in the storage of logging data which would otherwise occur as a result of failures in a tenant network. Embodiments can include a log agent defined within a system software layer of a computing node stack that examines open sockets for logging data, which logging data can include associated filename data. Based on examined filename data and with use of a mapping table that maps filenames to storage paths, a log agent can send logging data generated by a collection agent over a storage area network (SAN) for storage into a storage system. The log agent can store logging data within an appropriate file organized within an appropriate folder and volume of the storage system.

Figure 13:
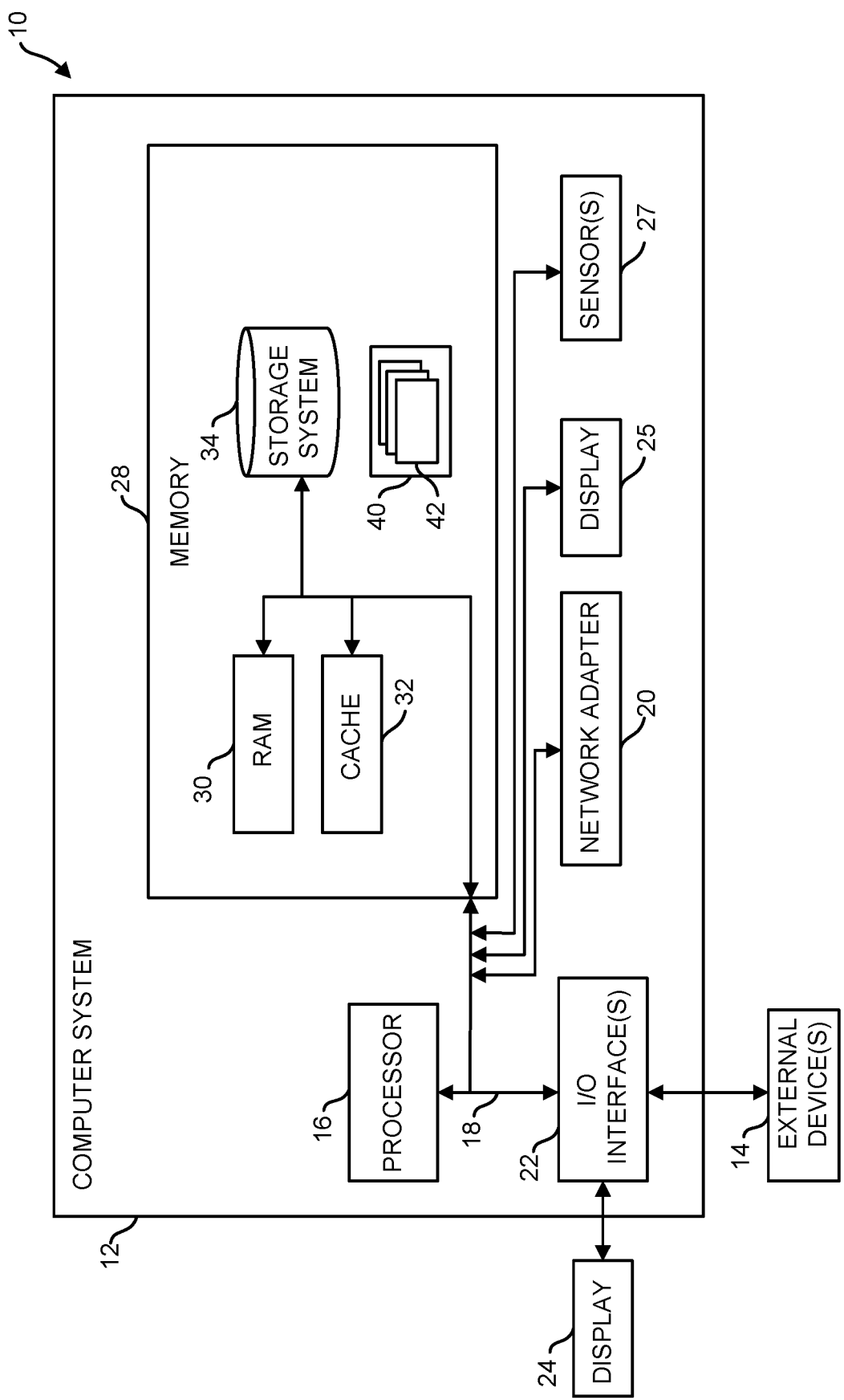
FIG. 13 depicts a computing node according to one embodiment.
Figure 14:
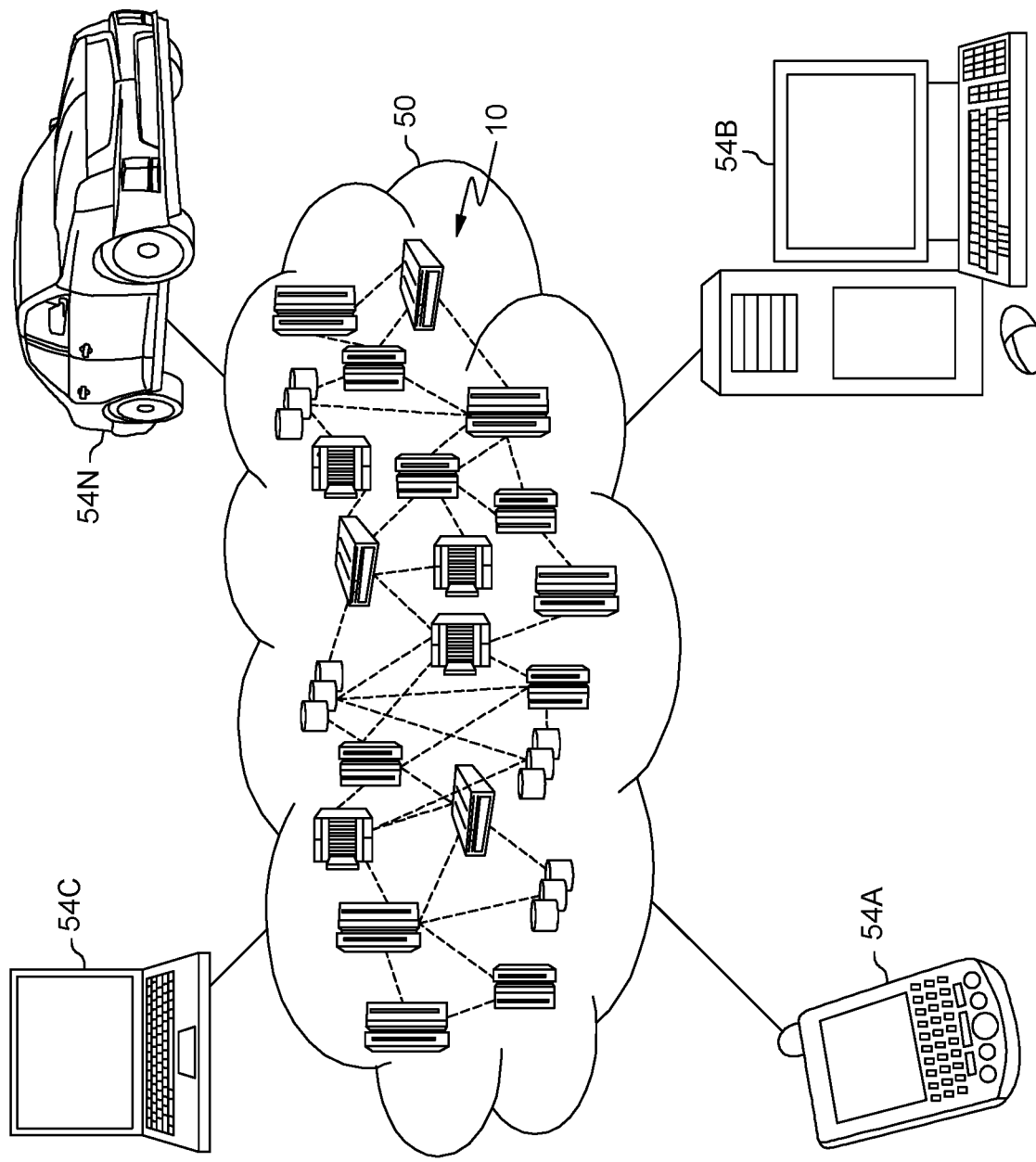
FIG. 14 depicts a cloud computing environment according to one embodiment.
Figure 15:
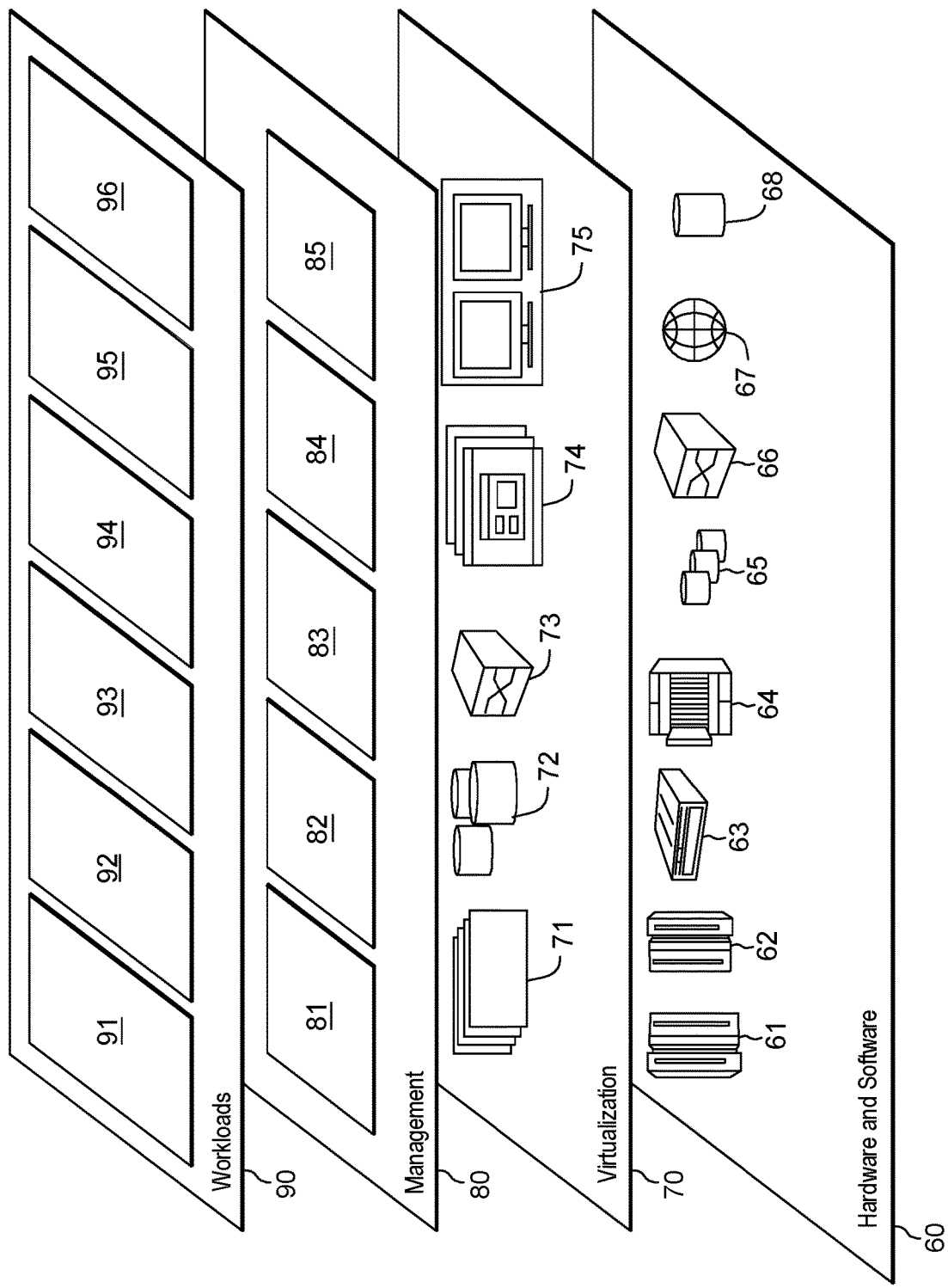
FIG. 15 depicts abstraction model layers according to one embodiment.

FIGS. 13-15 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multitenancy model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 13, a schematic of an example of a computing node provided by a physical computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system.

Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 13, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 14-15.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to manager system 110 of the flowchart of FIG. 2 and functions described with reference to computing node stacks 10A-10Z of the flowchart of FIG. 2 and functions described with reference to one or more resources 130A-130z as set forth in the flowchart of FIG. 2 and functions described with reference to clients 125A-125Z as set forth in the flowchart of FIG. 2 and functions described with reference to storage system 120 as set forth in the flowchart of FIG. 2. In one embodiment, the computing node based systems and devices depicted in FIGS. 1A and 1B can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 14 computing node 10 is described as being implemented in a cloud computing environment and accordingly is referred to as a cloud computing node in the context of FIG. 14.

Referring now to FIG. 14, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for storing logging data set forth herein. The processing components 96 can be implemented with use of one or more program 40 described in FIG. 13.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for use with a hosted service computing system that is architecturally represented as a computing node stack that is organized into a plurality of layers including system software layer, with the computing node stack including a plurality of computing nodes respectively representing server computers in the hosted service computing system, the computer implemented method comprising:
   deploying in the hosted service computing system, a log agent instantiation such that the log agent instantiation is running in the system software layer of the computing node stack representation of the hosted service computing system;
   deploying in the hosted service computing system, a log data collection agent instantiation;
   deploying, in the hosted service computing system a first instantiation of a first application, with the first instantiation of the first application being reserved for the use of a first tenant of a plurality of tenants of the hosted service computing system;
   receiving, by the log agent instantiation and from the log data collection agent instantiation, first application logging data that is generated by operations of the first instantiation of the first application and collected by the log data collection agent instantiation; and
   storing, by the log agent instantiation, the first application logging data in a storage area network (SAN) type storage system, wherein the method includes deploying, in the hosted service computing system a second instantiation of the first application, with the second instantiation of the first application being reserved for the use of a second tenant of the plurality of tenants of the hosted service computing system.

2. The computer implemented method of claim 1, wherein the method includes receiving, by the log agent instantiation and from a second log data collection agent instantiation, second application logging data that is generated by operations of a second instantiation of the first application and collected by the second log data collection agent instantiation; and storing, by the log agent instantiation, the second application logging data in the storage area network (SAN) type storage system.

3. The computer implemented method of claim 1, wherein the method includes deploying, in the hosted service computing system a second instantiation of the first application, with the second instantiation of the first application being reserved for the use of a second tenant of the plurality of tenants of the hosted service computing system, wherein the method includes receiving, by the log agent instantiation and from a second log data collection agent instantiation, second application logging data that is generated by operations of the second instantiation of the first application and collected by the second log data collection agent instantiation; and storing, by the log agent instantiation, the second application logging data in the storage area network (SAN) type storage system.

4. The computer implemented method of claim 1, wherein the method includes sending log data based on the application logging data stored in the SAN type storage system over an IP based tenant network of the first tenant in response to a monitoring of traffic intensity of the IP based tenant network of the first tenant.

5. The computer implemented method of claim 1, wherein the method includes sending log data based on the application logging data stored in the SAN type storage system over an IP based tenant network of the first tenant to the first tenant in response to an on demand request of the first tenant.

6. The computer implemented method of claim 1, wherein the method includes deploying, in the hosted service computing system a second instantiation of the first application, with the second instantiation of the first application being reserved for the use of a second tenant of the plurality of tenants of the hosted service computing system, wherein the method includes receiving, by the log agent instantiation and from a second log data collection agent instantiation, second application logging data that is generated by operations of the second instantiation of the first application and collected by the second log data collection agent instantiation; and storing, by the log agent instantiation, the second application logging data in the storage area network (SAN) type storage system, wherein the method includes maintaining a mapping table data structure that maps a storage volume of the SAN type storage system to the computing node stack, that maps a first folder of the storage volume to the first tenant, and that maps a second folder of the storage volume to the second tenant, wherein the storing, by the log agent instantiation, the first application logging data and the second application logging data into the SAN type storage system includes using the mapping table data structure.

7. A computer implemented program product for use with a hosted service computing system that is architecturally represented as a computing node stack that is organized into a plurality of layers including system software layer, with the computing node stack including a plurality of computing nodes respectively representing server computers in the hosted service computing system, the computer implemented program product comprising:
  a storage medium; and
  computer code including data and instructions for causing a processor(s) set to perform the method comprising:
    deploying in the hosted service computing system, a log agent instantiation such that the log agent instantiation is running in the system software layer of the computing node stack representation of the hosted service computing system, deploying in the hosted service computing system, a log data collection agent instantiation, deploying, in the hosted service computing system a first instantiation of a first application, with the first instantiation of the first application being reserved for the use of a first tenant of a plurality of tenants of the hosted service computing system, receiving, by the log agent instantiation and from the log data collection agent instantiation, first application logging data that is generated by operations of the first instantiation of the first application and collected by the log data collection agent instantiation, and storing, by the log agent instantiation, the first application logging data in a storage area network (SAN) type storage system, wherein the method includes deploying, in the hosted service computing system a second instantiation of the first application, with the second instantiation of the first application being reserved for the use of a second tenant of the plurality of tenants of the hosted service computing system.

8. The computer implemented program product of claim 7, wherein the method includes receiving, by the log agent instantiation and from a second log data collection agent instantiation, second application logging data that is generated by operations of the second instantiation of the first application and collected by the second log data collection agent instantiation; and storing, by the log agent instantiation, the second application logging data in the storage area network (SAN) type storage system.

9. The computer implemented program product of claim 7, wherein the method includes deploying, in the hosted service computing system a second instantiation of the first application, with the second instantiation of the first application being reserved for the use of a second tenant of the plurality of tenants of the hosted service computing system, wherein the method includes receiving, by the log agent instantiation and from a second log data collection agent instantiation, second application logging data that is generated by operations of the second instantiation of the first application and collected by the second log data collection agent instantiation; and storing, by the log agent instantiation, the second application logging data in the storage area network (SAN) type storage system.

10. The computer implemented program product of claim 7, wherein the method includes sending log data over an IP based tenant network of the first tenant in response to a monitoring of traffic intensity of the IP based tenant network of the first tenant, the log data including or derived using the application logging data stored in the SAN type storage system.

11. The computer implemented program product of claim 7, wherein the method includes sending log data based on the application logging data stored in the SAN type storage system over an IP based tenant network of the first tenant in response to an on demand request of the first tenant.

12. The computer implemented program product of claim 7, wherein the method includes deploying, in the hosted service computing system a second instantiation of the first application, with the second instantiation of the first application being reserved for the use of a second tenant of the plurality of tenants of the hosted service computing system, wherein the method includes receiving, by the log agent instantiation and from a second log data collection agent instantiation, second application logging data that is generated by operations of the second instantiation of the first application and collected by the second log data collection agent instantiation; and storing, by the log agent instantiation, the second application logging data in the storage area network (SAN) type storage system, wherein the method include maintaining a mapping table data structure that maps a storage volume of the SAN type storage system to the computing node stack, that maps a first folder of the storage volume to the first tenant, and that maps second folder of the storage volume to the second tenant, wherein the storing, by the log agent instantiation, the first application logging data and the second application logging data into the SAN type storage system includes using the mapping table data structure.

13. The computer implemented program product of claim 7, further comprising the processor(s) set to perform the method, and wherein the computer implemented program product is in the form of a computer system.

14. A computer implemented method comprising:
collecting, by a distributed logging system, logging data generated by operation of a distributed computing system that is used by a plurality of tenants; and
storing, under control of the distributed logging system and via a storage path, the logging data as a plurality of files stored in a multi-tier, shared volume storage system, with the storage of the logging data as a plurality of files including:
dividing the plurality of files among and between a plurality of shared volume data structures, and organizing each shared volume data structure of the plurality of shared volume data structures according to a plurality of tiers;
for each given file of the plurality of files;
mapping, by a domain agent and in a mapping table data structure, an association between the given file and the shared volume data structure in which the given file is stored, and mapping, by the domain agent and in the mapping table data structure, an association between the given file and a file path through the tiers to identify a location where given file is stored;
mounting, in read only mode a first shared volume data structure of the plurality of shared volume data structures; and
subsequent to the mounting, reading the logging data for a specified tenant of the plurality of tenants from the first shared volume data structure based upon the mappings of the mapping table.

15. The computer implemented method of claim 14, further comprising: performing logging analysis using the plurality of files stored in the multi tier, shared volume storage without losing logging data.

16. The computer implemented method of claim 14, further comprising: on each given compute node for a plurality of compute nodes of the distributed computing system, mounting a unique shared volume data structure of the plurality of shared volume data structures.

17. The computer implemented method of claim 14, further comprising: redirecting, by a log agent on a compute host, first logging data from a first log collector in a virtual machine running on the compute host.

18. The computer implemented method of claim 14, further comprising: redirecting, by a log agent on a compute host, first logging data from a first log collector in a container based virtual machine running on the compute host.

19. The computer implemented method of claim 14, wherein the method includes separating logging data traffic of a first tenant from client messaging data traffic of the first tenant.

20. The computer implemented method of claim 1, wherein the method includes separating logging data traffic of the first application logging data from client messaging data traffic of the first tenant.

\* \* \* \* \*